United States Patent
Grube et al.

(10) Patent No.: US 9,135,115 B2
(45) Date of Patent: Sep. 15, 2015

(54) STORING DATA IN MULTIPLE FORMATS INCLUDING A DISPERSED STORAGE FORMAT

(71) Applicant: CLEVERSAFE, INC., Chicago, IL (US)

(72) Inventors: Gary W. Grube, Barrington Hills, IL (US); Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 14/454,852

(22) Filed: Aug. 8, 2014

(65) Prior Publication Data

US 2014/0351632 A1    Nov. 27, 2014

Related U.S. Application Data

(63) Continuation-in-part of application No. 12/983,235, filed on Dec. 31, 2010, now Pat. No. 8,850,113.

(60) Provisional application No. 61/308,938, filed on Feb. 27, 2010, provisional application No. 61/314,166, filed on Mar. 16, 2010.

(51) Int. Cl.
*G06F 12/00* (2006.01)
*G06F 11/10* (2006.01)

(52) U.S. Cl.
CPC ........ *G06F 11/1092* (2013.01); *G06F 11/1076* (2013.01); *G06F 2211/1028* (2013.01)

(58) Field of Classification Search
None
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Jared Rutz
*Assistant Examiner* — Brendan Lillis
(74) *Attorney, Agent, or Firm* — Garlick & Markison; Timothy W. Markison

(57) ABSTRACT

A method begins by a processing module of a dispersed storage network (DSN) receiving data in a redundant array of independent disks (RAID) format and converting from the RAID format to an original format of the data. The method continues with the processing module dispersed storage error encoding a data segment of the data in the original format to produce a set of encoded data slices, where a set of encoded data slices includes a decode threshold sub-set of encoded data slices and an error correcting sub-set of encoded data slices. The method continues with the processing module converting the decode threshold sub-set of encoded data slices into a RAID formatted data segment, storing the RAID formatted data segment in RAID memory, and storing at least the error correcting sub-set of encoded data slices in DSN memory.

21 Claims, 31 Drawing Sheets

(56) References Cited

U.S. PATENT DOCUMENTS

| | | | |
|---|---|---|---|
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,581,156 B2 * | 8/2009 | Manasse | 714/781 |
| 7,636,724 B2 | 12/2009 | de la Torre et al. | |
| 7,657,823 B1 * | 2/2010 | Tang et al. | 714/784 |
| 2002/0062422 A1 | 5/2002 | Butterworth et al. | |
| 2002/0166079 A1 | 11/2002 | Ulrich et al. | |
| 2002/0194427 A1 * | 12/2002 | Hashemi | 711/114 |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0199566 A1 * | 10/2004 | Carlson et al. | 709/201 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0107091 A1 * | 5/2006 | Hafner et al. | 714/5 |
| 2006/0136448 A1 | 6/2006 | Cialini et al. | |
| 2006/0156059 A1 | 7/2006 | Kitamura | |
| 2006/0218470 A1 * | 9/2006 | Dickson | 714/767 |
| 2006/0224603 A1 | 10/2006 | Correll, Jr. | |
| 2007/0067697 A1 * | 3/2007 | Schnapp et al. | 714/758 |
| 2007/0079081 A1 | 4/2007 | Gladwin et al. | |
| 2007/0079082 A1 | 4/2007 | Gladwin et al. | |
| 2007/0079083 A1 * | 4/2007 | Gladwin et al. | 711/154 |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0065827 A1 * | 3/2008 | Byrne et al. | 711/114 |
| 2008/0183975 A1 * | 7/2008 | Foster et al. | 711/153 |
| 2009/0094251 A1 | 4/2009 | Gladwin et al. | |
| 2009/0094318 A1 | 4/2009 | Gladwin et al. | |
| 2009/0132851 A1 * | 5/2009 | Pruthi | 714/6 |
| 2010/0023524 A1 | 1/2010 | Gladwin et al. | |
| 2010/0023847 A1 * | 1/2010 | Morita et al. | 714/801 |
| 2010/0218037 A1 * | 8/2010 | Swartz et al. | 714/6 |
| 2010/0235604 A1 * | 9/2010 | Oe et al. | 711/170 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

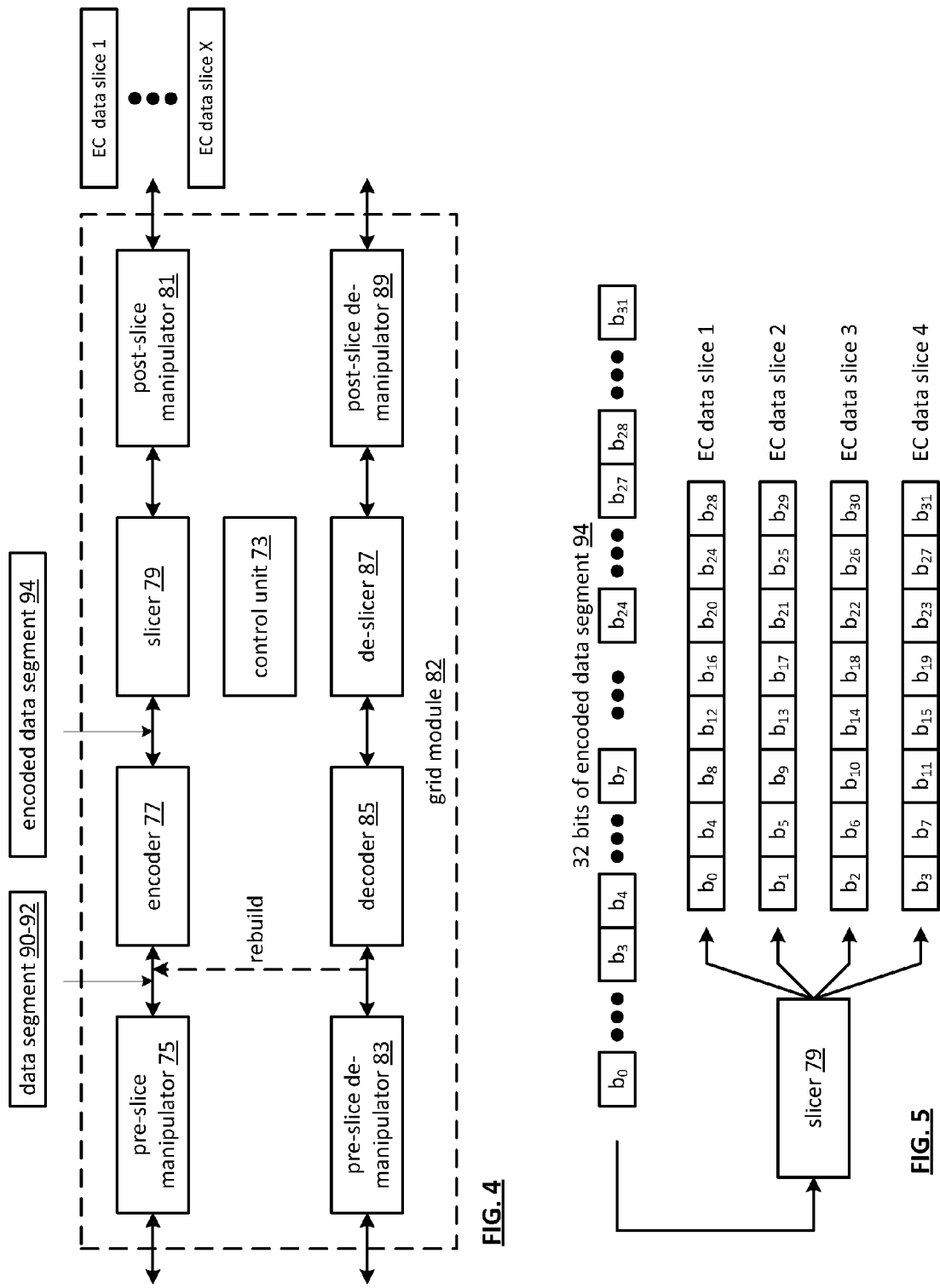

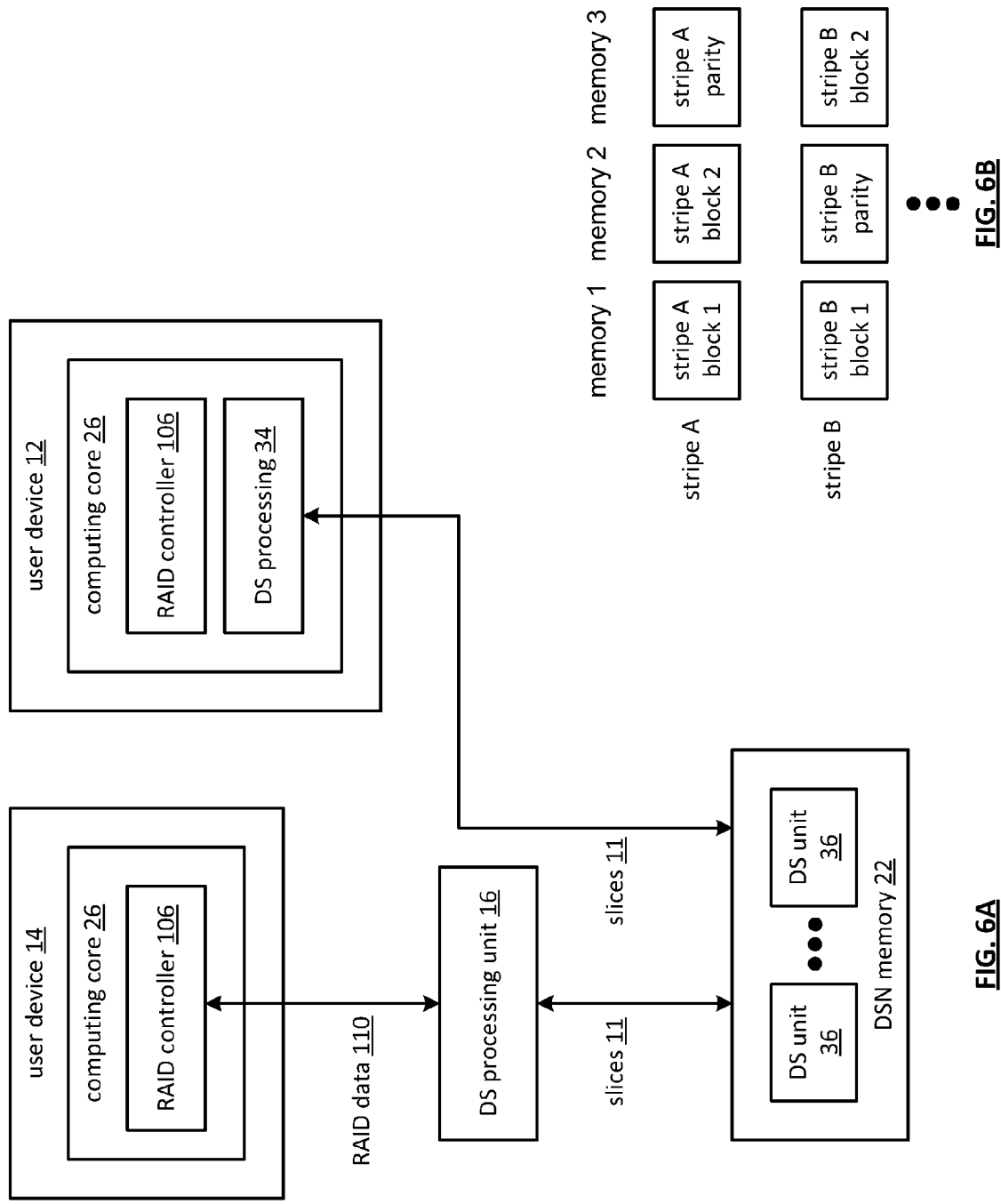

$$(E) * (D) = \text{coded matrix (C)}$$

$$\begin{bmatrix} 1 & 0 & 0 \\ 0 & 1 & 0 \\ 0 & 0 & 1 \\ j & k & l \\ m & n & o \end{bmatrix} * \begin{bmatrix} D1 & D2 & D3 & D4 \\ D5 & D6 & D7 & D8 \\ D9 & D10 & D11 & D12 \end{bmatrix} = \begin{bmatrix} D1 & D2 & D3 & D4 \\ D5 & D6 & D7 & D8 \\ D9 & D10 & D11 & D12 \\ X41 & X42 & X43 & X44 \\ X51 & X52 & X53 & X54 \end{bmatrix}$$

encoded data blocks 193
⇒ data slice 1
⇒ data slice 2
⇒ data slice 3
⇒ error correcting slice 4
⇒ error correcting slice 5

STORING DATA IN MULTIPLE FORMATS INCLUDING A DISPERSED STORAGE FORMAT

CROSS REFERENCE TO RELATED PATENTS

The present U.S. Utility Patent Application claims priority pursuant to 35 U.S.C. §120 as a continuation-in-part of U.S. Utility application Ser. No. 12/983,235, entitled "DATA MIGRATION BETWEEN A RAID MEMORY AND A DISPERSED STORAGE NETWORK MEMORY," filed Dec. 31, 2010, now U.S. Pat. No. 8,850,113, issued on Sep. 30, 2014, which claims priority pursuant to 35 U.S.C. §119(e) to U.S. Provisional Application No. 61/308,938, entitled "MULTIPLE MEMORY TYPE STORAGE SYSTEM," filed Feb. 27, 2010; and U.S. Provisional Application Ser. No. 61/314,166, entitled "STORAGE AND RETRIEVAL IN A DISTRIBUTED STORAGE SYSTEM," filed Mar. 16, 2010, all of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc., are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 6A is a schematic block diagram of another embodiment of a computing system in accordance with the present invention;

FIG. 6B is a diagram illustrating an example of data and parity assignments to memory in accordance with the present invention;

DETAILED DESCRIPTION OF THE INVENTION

Figure 1:
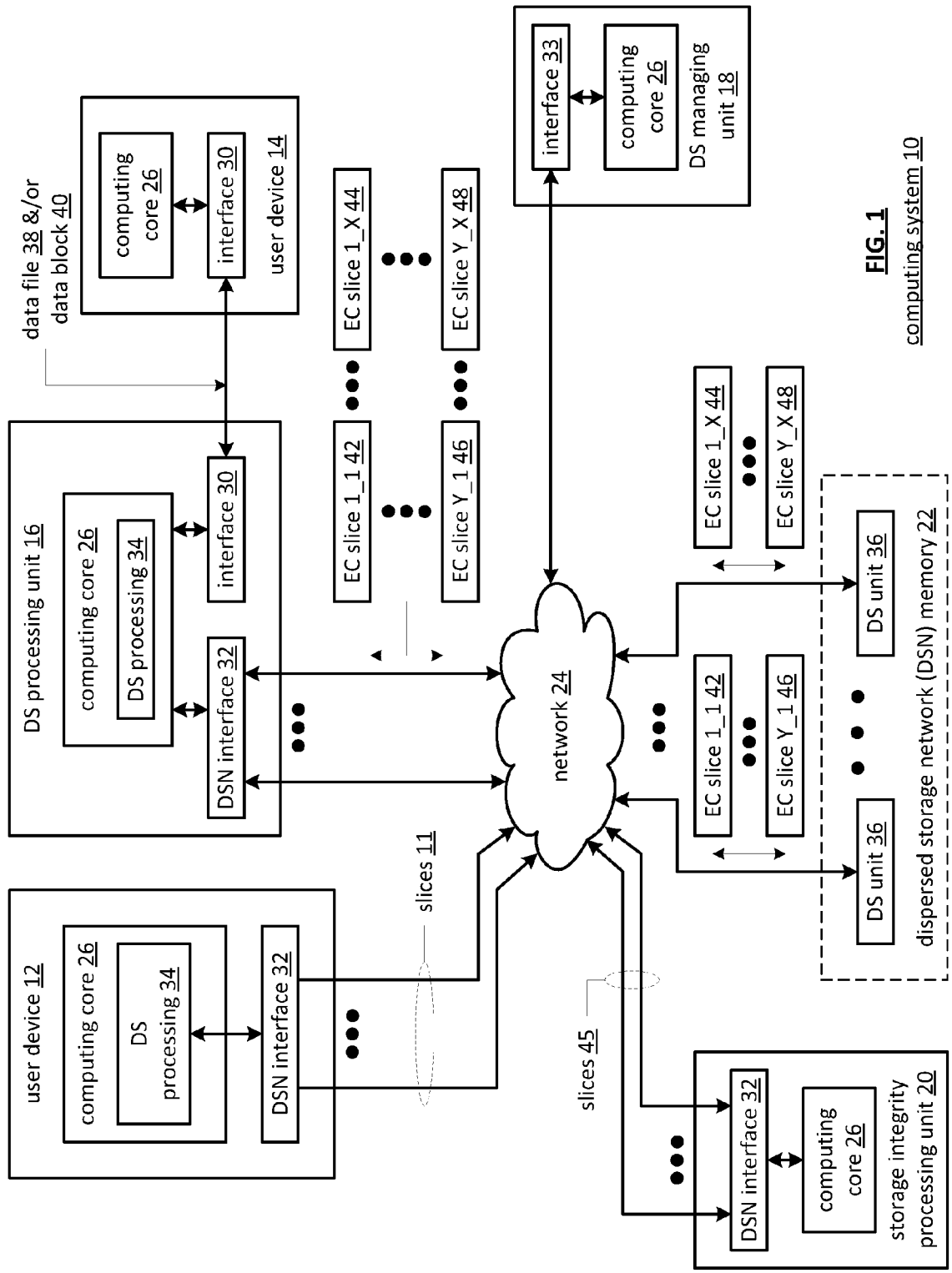
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-25.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-25.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
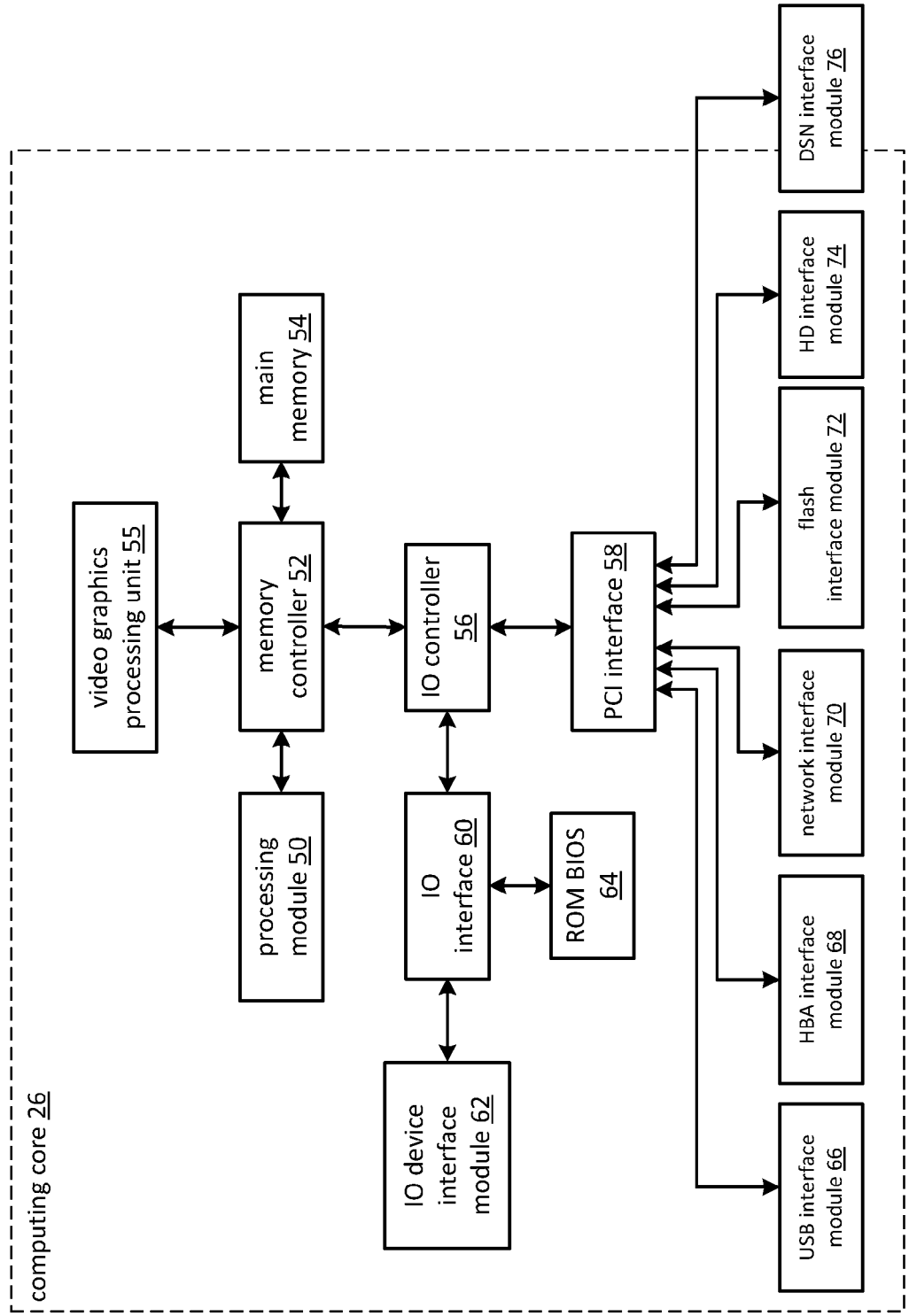
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-25.

Figure 3:
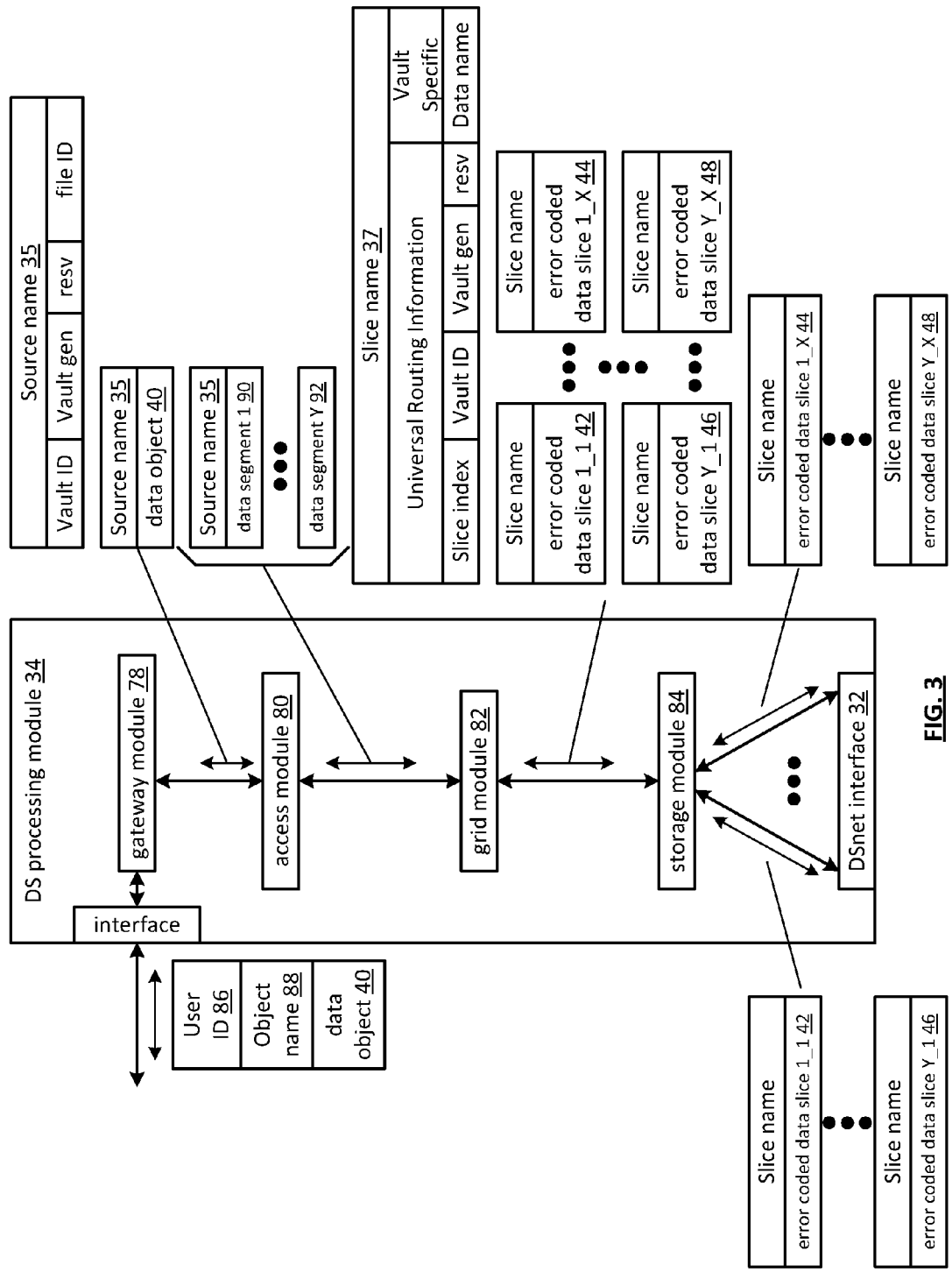
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the DS management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6A is a schematic block diagram of another embodiment of a computing system that includes one or more of a first type of user devices 12, one or more of a second type of user devices 14, a dispersed storage (DS) processing unit 16, and a dispersed storage network (DSN) memory 22. Note that the DSN memory 22 includes a plurality of DS units 36, wherein the DS units 36 may be deployed at one or more sites. User device 14 includes a computing core 26, wherein the computing core 26 includes a redundant array of independent disks (RAID) controller 106. User device 12 includes the computing core 26, wherein the computing core 26 includes the RAID controller 106 and a DS processing 34.

The RAID controller 106 receives data (e.g., data in the format of data blocks, data objects, and/or data files in accordance with a file system) from the computing core 26 and creates RAID data from the data in accordance with a RAID method. Such a RAID method is discussed in greater detail with reference to FIG. 6B. The data provided by the computing core 26 to the RAID controller 106 may be referenced by one or more of a data object name, a file name, a block number, a data object identifier(ID), and/or a file ID. In addition, the data is described by metadata, which may include one or more of a data type, a data size, a priority indicator, a security indicator, a performance indicator, a user ID, a group ID, a timestamp, and other descriptors to describe the data.

The RAID controller 106 produces RAID data that includes the data and one or more of metadata commands, memory information, status information, and requests. Such commands include one or more of write, read, delete, status, erase, and invert. Such memory information includes physical addresses utilized within a RAID memory. For example, the RAID controller 106 of user device 14 sends RAID data 110 to the DS processing unit 16 such that the DS processing unit 16 facilitates storing data of the RAID data 110 in the DSN memory 22 as encoded data slices 11. As another example, the RAID controller 106 of user device 12 sends RAID data to the DS processing 34 such that the DS processing 34 facilitates storing data of the RAID data in the DSN memory 22 as the encoded data slices 11.

In an example of a data storage operation, the DS processing unit 16 receives RAID data 110 from the RAID controller 106 of user device 14, wherein the RAID data includes a store command and the data. The DS processing unit 16 determines a DS storage method, wherein the DS storage method includes creating encoded data slices of the data based on the entire data object (e.g., all the RAID blocks in aggregate) or creating encoded data slices based on one RAID block at a time. Next, the DS processing unit 16 creates encoded data slices based on the RAID data in accordance with the DS storage method. The DS processing unit 16 sends the encoded data slices 11 to the DSN memory 22 for storage therein. Note that the DS processing 34 of user device 12 operates in a similar manner to store data of RAID data from the RAID controller 106 of the user device 12 as encoded data slices 11 in the DSN memory 22. The method to create the encoded data slices 11 based on the RAID data is discussed in greater detail with reference to FIG. 7.

In an example of a data retrieval operation, the DS processing unit 16 receives RAID data 110 from the RAID controller 106, wherein the RAID data includes a retrieve command. The DS processing unit 16 determines a DSN memory location of encoded data slices corresponding to requested RAID data. The DS processing unit 16 retrieves encoded data slices 11 from the DSN memory 22 at the DSN memory location and determines the DS storage method. The DS processing unit 16 recovers the requested RAID data from the retrieved encoded data slices in accordance with the DS storage method and the RAID format. The DS processing unit 16 sends the requested RAID data to the RAID controller 106. The method to recover RAID data is discussed in greater detail with reference to FIG. 8.

FIG. 6B is a diagram illustrating an example of data and parity assignments to memory that includes data stripes A-B assigned to memories 1-3. Such memories 1-3 are included in a redundant array of independent disks (RAID) memory and are assigned to store RAID data as a plurality of data stripes that each includes a plurality of blocks. Such blocks includes RAID block data or RAID parity data created in accordance with a RAID method based on data to be stored. Such a RAID method includes an approach to produce and store RAID data based on the data to be stored and in accordance with one or more industry RAID standards and/or techniques (e.g., RAID 0-6). One such approach to produce and store RAID data includes dividing the data into RAID block data blocks and storing the RAID block data blocks in different memories.

Another approach to produce and store RAID data includes dividing the data into RAID block data blocks, replicating at least some of the RAID block data blocks to produce replicated RAID block data blocks, and storing the RAID block data blocks and the replicated RAID block data blocks in different memories. Still another approach to produce and store RAID data includes dividing the data into RAID block data blocks, calculating RAID parity blocks, and storing the RAID block data blocks and the RAID parity data blocks in different memories. For example, data is converted into RAID data in accordance with the RAID method; wherein the RAID data includes a plurality of data stripes A, B, etc. Each data stripe of the plurality of data stripes includes a set of three blocks, wherein the set of three blocks includes two RAID block data blocks and one RAID parity data block. In a specific example, a logical exclusive OR (XOR) is calculated of a first RAID block data block of the two RAID like data blocks with a second RAID block data block to produce the RAID parity data block. Note that the data stripe is reproducible when any two blocks of the set of three blocks is available. Each block of the set of three blocks is assigned to one memory of the RAID memory for storage therein. For example, stripe A RAID block data block 1 is assigned to memory 1, stripe A RAID block data block 2 is assigned to memory 2, and stripe A RAID parity data block is assigned to memory 3.

Figure 6C:
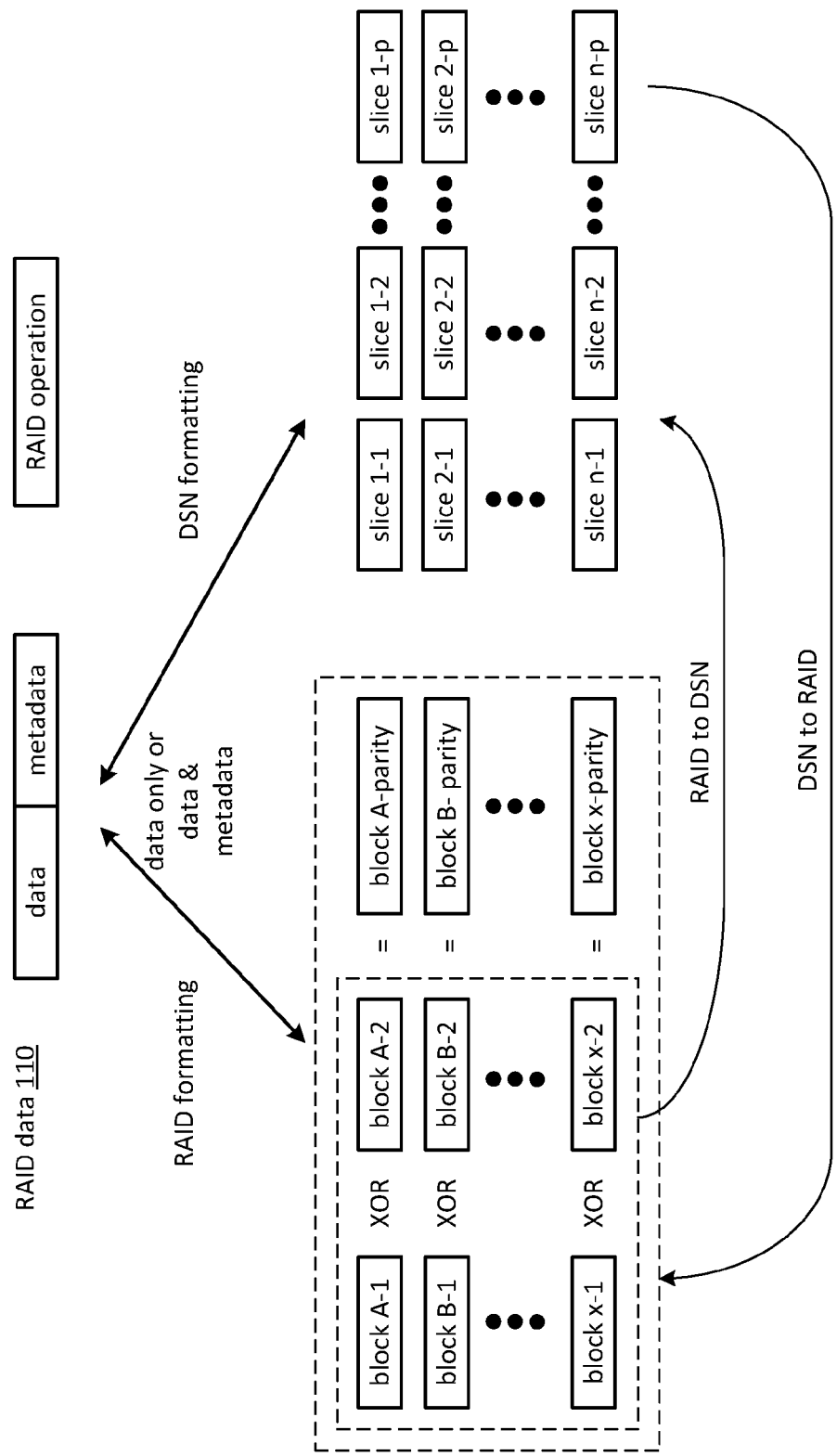
FIG. 6C is a diagram illustrating an example of converting data storage between RAID formatting and DSN formatting in accordance with the present invention.

FIG. 6C is a diagram illustrating an example of converting data storage between RAID formatting and DSN formatting. In this example, RAID data 110 includes data, metadata, and a RAID operation (e.g., one or more of metadata commands, memory information, status information, and requests). The RAID data 110 may be stored using RAID formatting and/or DSN formatting. For RAID formatting, the data (which may include the metadata) is arranged into stripes (e.g., rows A, B, through x) and each stripe includes a plurality of columns (3 in this example, but may include more). Two of the stripe blocks each includes a data block and the third includes a parity data, which is produced by exclusive ORing the other two data blocks.

The DSN formatting segments the data (which may further include the metadata) into one or more data segments (n number of data segments are shown in this example). Each of the data segments is error encoded using an error coding dispersal storage function to produce a set of encoded data slices (e.g., 1 through p, where p represents the pillar width of the error coding dispersal storage function).

The DS processing unit 16 functions to allow the RAID data 110 to be stored in accordance with the RAID formatting, the DSN formatting, and/or converted therebetween. For example, the DS processing unit 16 enables the RAID data to be stored in accordance with the RAID format in RAID memory (not shown in this figure). As such, the DS processing unit 16 would pass the RAID data to the RAID memory for storage therein. Alternatively, the DS processing unit 16 performs the RAID formatting on the RAID data 110 and stored the RAID formatted data in local memory, RAID memory, a section of the DSN memory 22 reserved for RAID storage, and/or some other memory.

In another example, the DS processing unit 16 enables the RAID data 110 to be stored in the DSN formatting in the DSN memory 22. In this instance, the DS processing unit 16 segments the data and error encodes the segments as previously discussed.

In yet another example, the DS processing unit 16 (or other processing module) determines to convert stored data from the RAID format to the DSN format. In this instance, the DS processing unit 16 retrieves a sufficient number of data blocks per stripe to produce the original data (e.g., blocks 1 and 2 and not the parity data block). The DS processing unit 16 reconstructs the data from the retrieved data blocks, segments the reconstructed data and error encodes the segments to produce a plurality of sets of encoded data slices.

In a further example, the DS processing unit 16 (or other processing module) determines to convert stored data from the DSN format to the RAID format. In this instance, the DS processing unit 16 reconstructs the data from the plurality of sets of encoded data slices. The DS processing unit 16 then partitions the reconstructed data into stripes, which includes two or more data blocks. The DS processing unit 16 then creates parity data for each stripe from the data blocks. The resulting RAID formatted data may be stored in RAID memory, local memory, a section of the DSN memory 22 reserved for RAID storage, and/or some other memory.

Figure 7:
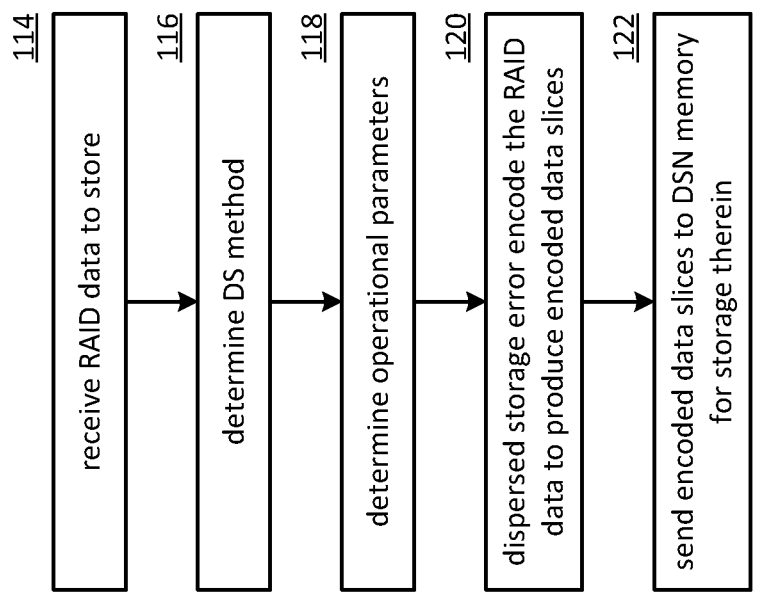
FIG. 7 is a flowchart illustrating an example of storing data in accordance with the present invention.

FIG. 7 is a flowchart illustrating an example of storing data. A method begins with step 114 where a processing module receives data for storage and interprets the data to identify the data as redundant array of independent disks (RAID) data. For example, the processing module receives a RAID data storage request message from a RAID controller. Such a RAID data storage request message may include one or more of the RAID data, a RAID data storage request, a data object name, a data object, a data object size, a data type, a data block, parity information, a user identifier (ID), RAID unit information, disk drive information, address information, memory information, a command, and RAID method information. As another example, the processing module sends a request to a RAID memory device regarding the RAID data and receives the RAID data from the RAID memory device.

The method continues at step 116 where the processing module determines a dispersed storage (DS) method where the DS method includes producing encoded data slices based on one RAID block at a time and/or producing encoded data slices based on all the data at once. This step may further include identifying one or more of a first pillar slice portion and a second pillar slice portion (e.g., which portion to send to which memory when multiple memories are available). Such a determination is based on one or more of interpreting the RAID data to identify at least one of RAID block data and RAID parity data, a vault lookup, RAID memory configuration information, a dispersed storage network memory configuration, memory capability information, a comparison of memory capability information of memories, a command, a message, a predetermination, a data object name, a data object, a data object size, a data type, a data block, parity information, a user identifier (ID), RAID unit information, disk drive information, address information, memory information, a command, and a request. For example, the processing module determines the DS method to include encoding the RAID block data in accordance with error coded dispersal storage option parameters to produce at least one set of encoded data slices when the RAID data includes RAID block data and RAID parity data. As another example, the processing module determines the DS method to include producing encoded data slices based on one RAID block at a time when a vault lookup for this user ID indicates to produce encoded data slices based on one RAID block at a time.

The method continues at step 118 where the processing module determines error coding dispersal storage function parameters (e.g., operational parameters) where the error coding dispersal storage function parameters may include one or more of a RAID method, a pillar width, a read threshold, a decode threshold, a write threshold, an encode algorithm, a decode algorithm, an encryption method, an encryption key, a source name based on the data object name, and dispersed storage network (DSN) storage location information. Such a determination may be based on at least one of the RAID data, detection of the RAID block data, the RAID parity data, detection of a RAID data stripe, RAID data checksum information, a vault lookup, RAID memory configuration information, a command, a message, a predetermination, a data object name, a data object, a data object size, a data type, a data block, parity information, a user identifier (ID), RAID unit information, disk drive information, address information, memory information, a command, and a request.

The method continues at step 120 where the processing module encodes the RAID block data based on the DS method and in accordance with the error coding dispersal storage function parameters to produce at least one set of encoded data slices when the RAID data includes RAID block data and RAID parity data. For example, the processing module determines an accuracy of the RAID block data based on the RAID parity data (e.g., utilize the RAID parity data to re-create raid block data, compare the recreated RAID block data with the RAID block data to determine the accuracy of the RAID block data) and when the accuracy of the RAID block data compares unfavorably to a desired accuracy (e.g., not the same due to errors), corrects the RAID block data based on the RAID parity data, and encodes the RAID block data to produce the at least one set of encoded data slices. The method continues at step 122 where the processing module outputs the at least one set of encoded data slices to a dispersed storage network (DSN) memory for storage therein.

Alternatively, when the RAID data only includes the RAID parity data, the processing module encodes the RAID parity data in accordance with the error coding dispersal storage function parameters to produce the at least one set of encoded parity slices and outputs the at least one set of encoded parity slices to the DSN memory for storage therein.

Figure 8:
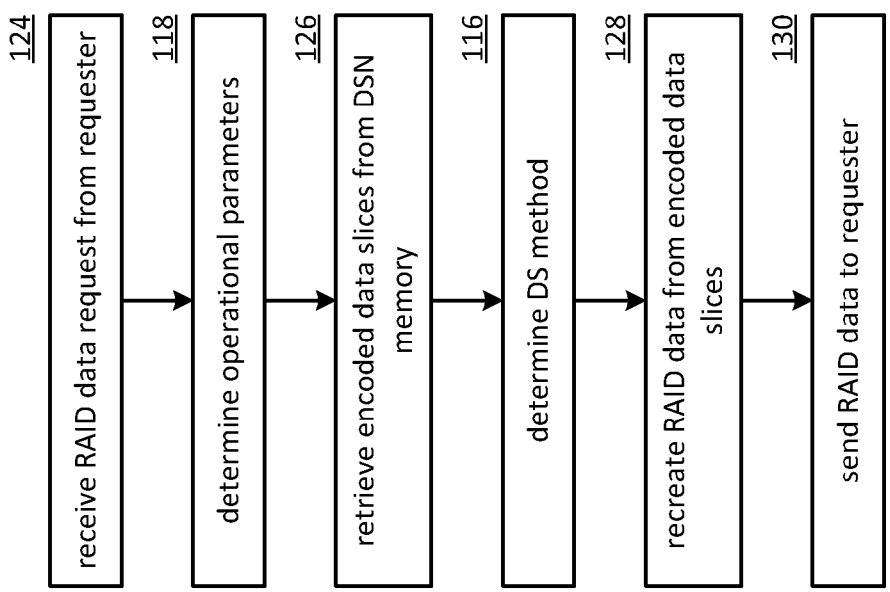
FIG. 8 is a flowchart illustrating an example of retrieving data in accordance with the present invention.

FIG. 8 is a flowchart illustrating an example of retrieving data, which includes similar steps to FIG. 7. A method begins with step 124 where a processing module receives a data retrieval request from a requester and interprets the data retrieval request to identify the data retrieval request as a redundant array of independent disks (RAID) data retrieval request. For example, the processing module receives a RAID data retrieval request message from a RAID controller. Such a RAID data retrieval request message may include one or more of the data retrieval request, a data object name, a data object size, a data type, a user identifier (ID), RAID unit information, disk drive information, address information, memory information, a command, and RAID method information. The method continues at step 118 of FIG. 7 to determine error coding dispersal storage option parameters.

The method continues at step 126 where the processing module retrieves at least one set of encoded data slices from a dispersed storage network (DSN) memory based on the RAID data retrieval request. For example, the processing module determines a DSN address corresponding to the at least one set of encoded data slices based on the data object name included in the RAID data retrieval request, sends at least one encoded data slice retrieval request to the DSN memory that includes the DSN address corresponding to the response of encoded data slices, and receives at least a decode threshold number of encoded data slices of the at least one set of encoded data slices from the DSN memory in response. The method continues at step 116 of FIG. 7 to determine a DS method.

The method continues at step 128 where the processing module dispersed storage error decodes the at least one set of encoded data slices in accordance with the error coding dispersal storage function parameters to produce RAID data. Next, the processing module interprets the RAID data to determine whether the RAID data represents a stripe of data or a stripe-block of data (e.g., one block of RAID block data). Such interpreting of the RAID data includes interpreting a header section of the RAID data to determine whether the RAID data represents the stripe of data or the stripe-block of data. The processing module generates RAID parity data from the RAID block of data of the RAID data when the RAID data represents the stripe of data. The method continues at step 130 where the processing module outputs the RAID block data and the RAID parity data to the requester. Alternatively, or in addition to, the processing module outputs the RAID data when the RAID data represents the stripe-block of data.

Figure 9A:
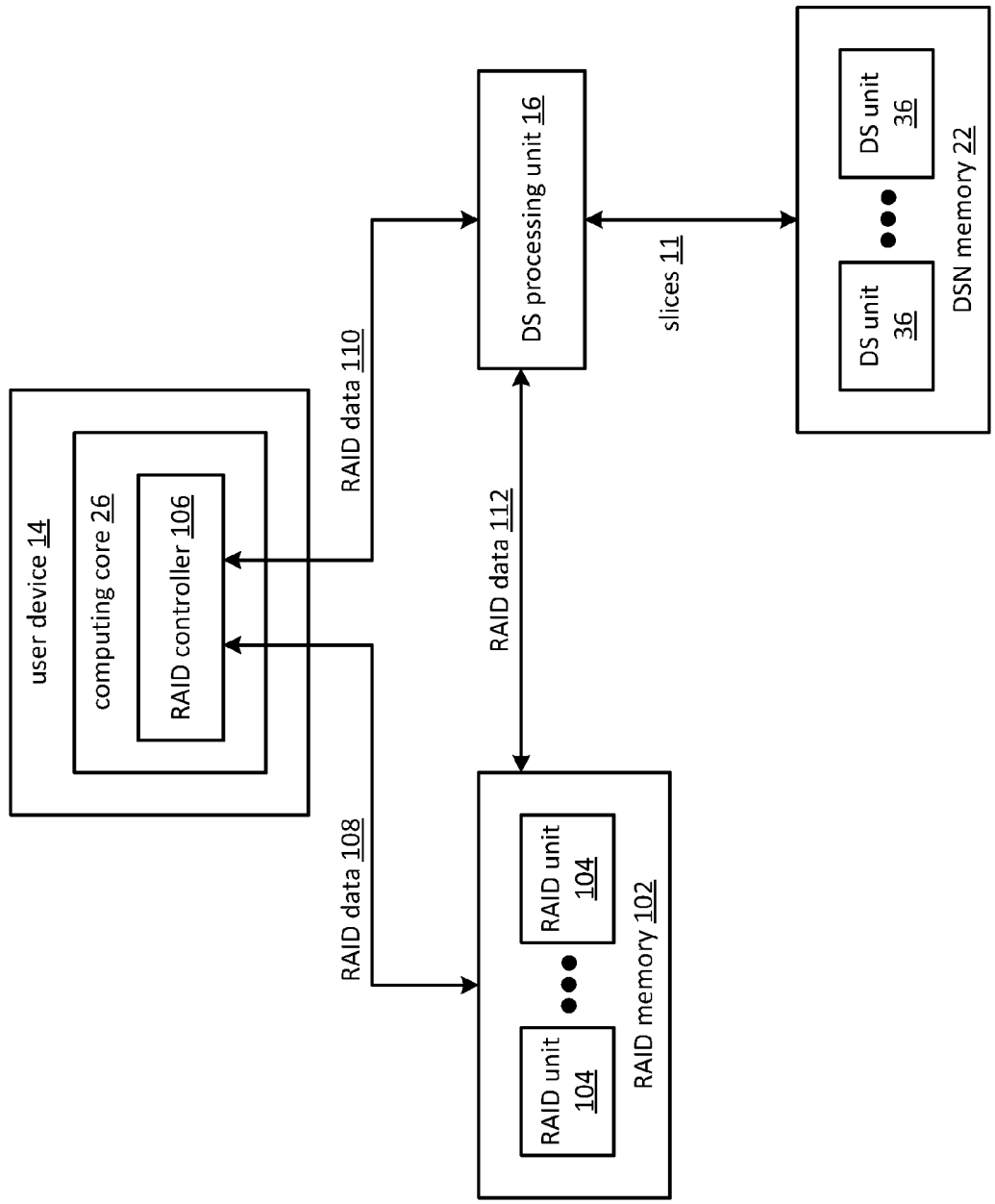
FIG. 9A is a schematic block diagram of another embodiment of a computing system in accordance with the present invention.

FIG. 9A is a schematic block diagram of another embodiment of a computing system that includes a user device 14, a dispersed storage (DS) processing unit 16, a redundant array of independent disks (RAID) memory 102, and a dispersed storage network (DSN) memory 22. Note that the DSN memory 22 includes a plurality of DS units 36, wherein the DS units 36 may be deployed at one or more sites. User device 14 includes a computing core 26, wherein the computing core 26 includes a RAID controller 106. Alternatively, or in addition to, the user device 14 may include a DS processing as discussed with reference to FIG. 6A.

The RAID memory 102 includes a plurality of RAID units 104. Such RAID units 104 include an associated memory and/or memory element, which may be a single memory device or a plurality of memory devices. Such a memory device may be a read-only memory, a read-write memory, random access memory, volatile memory, non-volatile memory, static memory, dynamic memory, flash memory, cache memory, a magnetic disk drive, and/or any device that stores digital information. For example, the RAID memory 102 includes five RAID units 104, wherein each of the five RAID units 104 includes at least one magnetic disk drive memory.

The RAID controller 106 stores RAID data 108 in the RAID memory 102 and/or RAID data 110 in the DSN memory 22 via the DS processing unit 16. The DS processing unit 16 operates as previously discussed with reference to FIGS. 6A-8 to receive RAID data 110 and store the RAID data 110 as encoded data slices 11 in the plurality of DS units 36 of the DSN memory 22 and to retrieve the encoded data slices 11 from the DSN memory 22 to reproduce the RAID data 110. In addition, the DS processing unit 16 functions to backup RAID data 108 stored in the RAID memory 102 as discussed with reference to FIGS. 9A-10.

In an example of a data backup operation, the DS processing unit 16 sends RAID data 112 (e.g., including a retrieve RAID data command) to the RAID memory 102 to retrieve stored RAID data from the RAID memory 102. Note that the DS processing unit 16 communicates with the RAID memory 102 utilizing RAID commands as utilized by the RAID controller 106 to access the RAID memory 102. Next, the DS processing unit 16 receives RAID data 112 from the RAID memory 102. The DS processing unit 16 dispersed storage error encodes data of the RAID data 112 to produce encoded data slices. The DS processing unit 16 sends the encoded data slices to the DSN memory 22 for storage therein. The method to copy and/or backup RAID data is discussed in greater detail with reference to FIGS. 9B and 10.

Alternatively, the user device 14 may be implemented as a user device 12 that includes a DS processing 34 as discussed with reference to FIG. 6A. In an example of a data retrieval operation, the computing core 26 determines to utilize the RAID controller 106 to retrieve data as RAID data 108 and/or RAID data 110 or to utilize the DS processing 34 to directly retrieve encoded data slices from the DSN memory 22 to reproduce the data when the user device 12 includes the DS processing 34. Such a determination may be based on one or more of estimated RAID data retrieval performance, estimated DSN data retrieval performance, a performance goal, a query, performance history, a message, and a command. For example, the computing core 26 determines to retrieve the data as RAID data 108 from the RAID memory 102 when the estimated RAID data retrieval performance compares more favorably to the performance goal than the estimated DSN data retrieval performance.

Figure 9B:
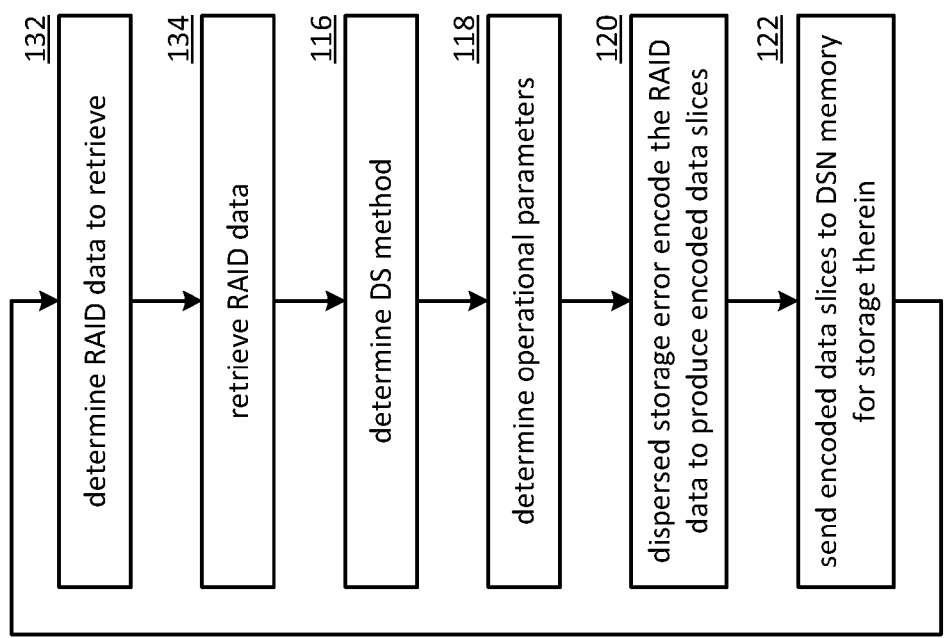
FIG. 9B is a flowchart illustrating an example of copying data in accordance with the present invention.

FIG. 9B is a flowchart illustrating an example of copying data, which includes many similar steps to FIG. 7. The method begins with step 132 where a processing module determines redundant array of independent disks (RAID) data to retrieve. Such RAID data may include data to copy and/or backup, wherein the RAID data is currently stored in a RAID memory. Such a determination may be based on one or more of which portion of the RAID memory was most recently retrieved for copying and/or backup, a particular RAID unit, a particular physical memory, a particular RAID memory, an elapsed time since the last retrieval and storage of the same RAID data, a command, a message, a predetermination, a vault lookup, and an error message.

The method continues at step 134 where the processing module retrieves the RAID data. For example, the processing module retrieves the RAID data by sending a retrieve RAID data command to one or more of the RAID units of the RAID memory and receiving the RAID data in response. Such a retrieve RAID data command may include one or more of a command, RAID unit information, disk drive information, address information, and memory information. The method continues with steps 116, 118, 120, and 122 of FIG. 7 to store the RAID data as encoded data slices in a dispersed storage network (DSN) memory. Note that the processing module may indicate that the encoded data slices are associated with a new revision of a data object that has been previously stored in the DSN memory. The method repeats back to step 132 to copy more RAID data. Note that the method provides a reliability improvement when a DS processing unit provides access to RAID data stored as encoded data slices in the DSN memory when the RAID memory fails.

Figure 10:
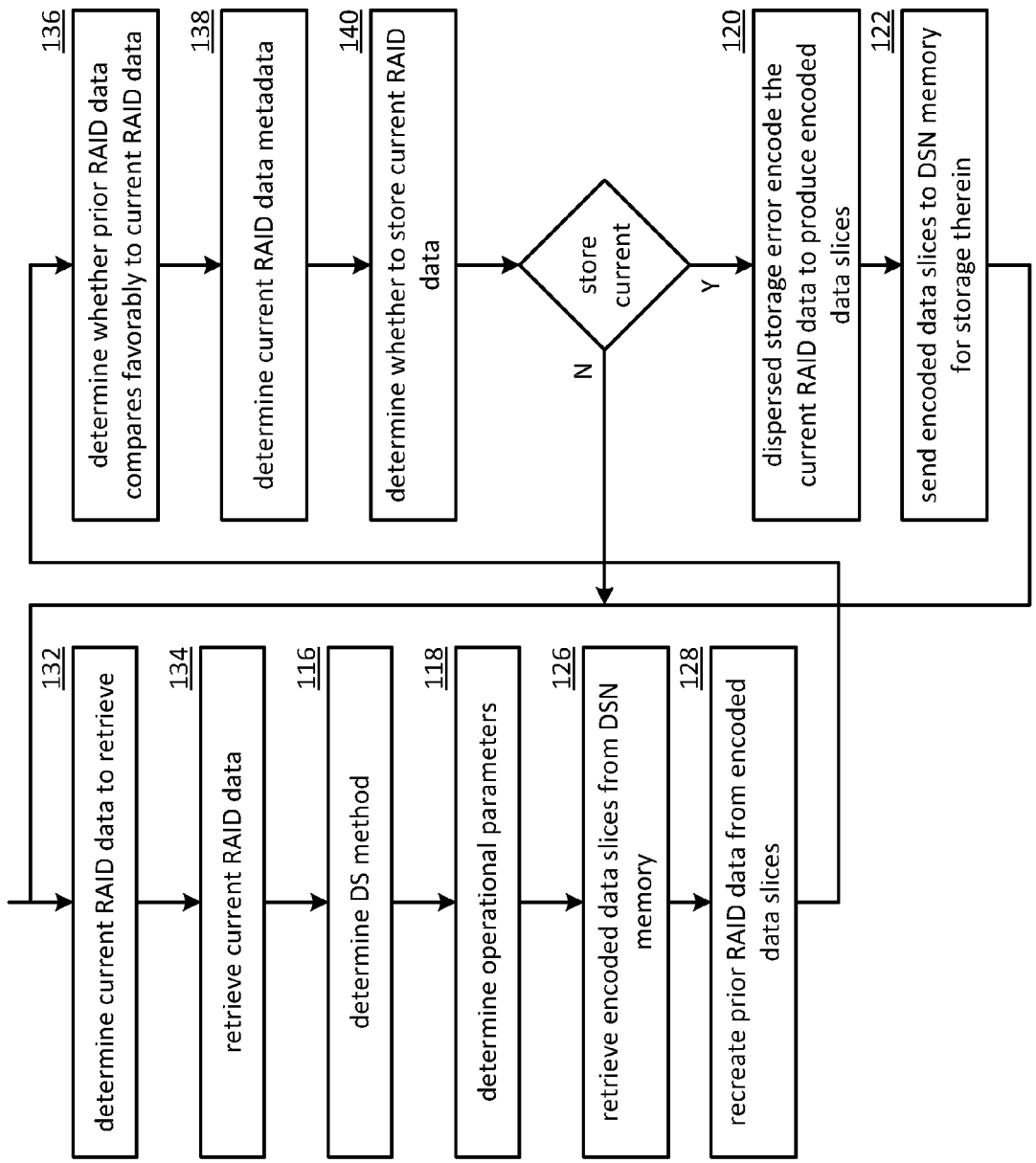
FIG. 10 is a flowchart illustrating another example of copying data in accordance with the present invention.

FIG. 10 is a flowchart illustrating another example of copying data, which includes many similar steps to FIGS. 7, 8, and 9B. The method begins with steps 132 and 134 of FIG. 9B to retrieve current redundant array of independent disks (RAID) data and then continues with steps 116 and 118 of FIG. 7 and with steps 126 and 128 of FIG. 8 to re-create prior redundant array of independent disks (RAID) data from stored encoded data slices (e.g., stored in a dispersed storage network (DSN) memory), wherein the prior RAID data (e.g., a backup copy) is associated with the current RAID data (e.g., a working copy).

The method continues at step 136 where the processing module determines if the prior RAID data compares favorably to the current RAID data based on at least one comparison criterion. Such comparison criteria may include one or more of comparing data of the prior RAID data to data of the current RAID data and/or comparing an age indicator of the prior RAID data to an age threshold. For example, the processing module determines that the comparison is unfavorable when the prior RAID data and the current RAID data are different. As another example, processing module determines that the comparison is unfavorable when the age indicator of the prior RAID data is greater than the age threshold.

The method continues at step 138 where the processing module determines RAID data metadata (e.g., of the current RAID data), wherein the metadata includes one or more of prior RAID data age, a backup frequency indicator, an age threshold, a data type, a data size, a priority indicator, a security indicator, a performance indicator, a user ID, a group ID, a timestamp, and any other descriptors to describe the data. Such a determination may be based on one or more of the current RAID data, the prior RAID data, other RAID data, a vault lookup, a command, a message, a predetermination, and an access frequency record.

The method continues at step 140 where the processing module determines whether to store the current RAID data based on one or more of the comparison of the prior RAID data to the current RAID data (e.g., results of step 136), the RAID data metadata, a comparison of the prior RAID data age to the age threshold, a predetermination, a command, a message, a vault lookup, and a comparison of access frequency to an access frequency threshold. For example, the processing module determines to store (e.g., backup) the current RAID data when the current RAID data is different than the prior RAID data and the prior RAID data age is above the age threshold. The method repeats back to step 132 when the processing module determines to not store the current RAID data. The method continues to step 120 of FIG. 7 when the processing module determines to store the current RAID data. The method continues with steps 120 and 122 of FIG. 7 to store encoded data slices of the RAID data (e.g., the current RAID data) in the DSN memory. The method branches back to step 132 to potentially retrieve and backup a next portion of the current RAID data.

Figure 11:
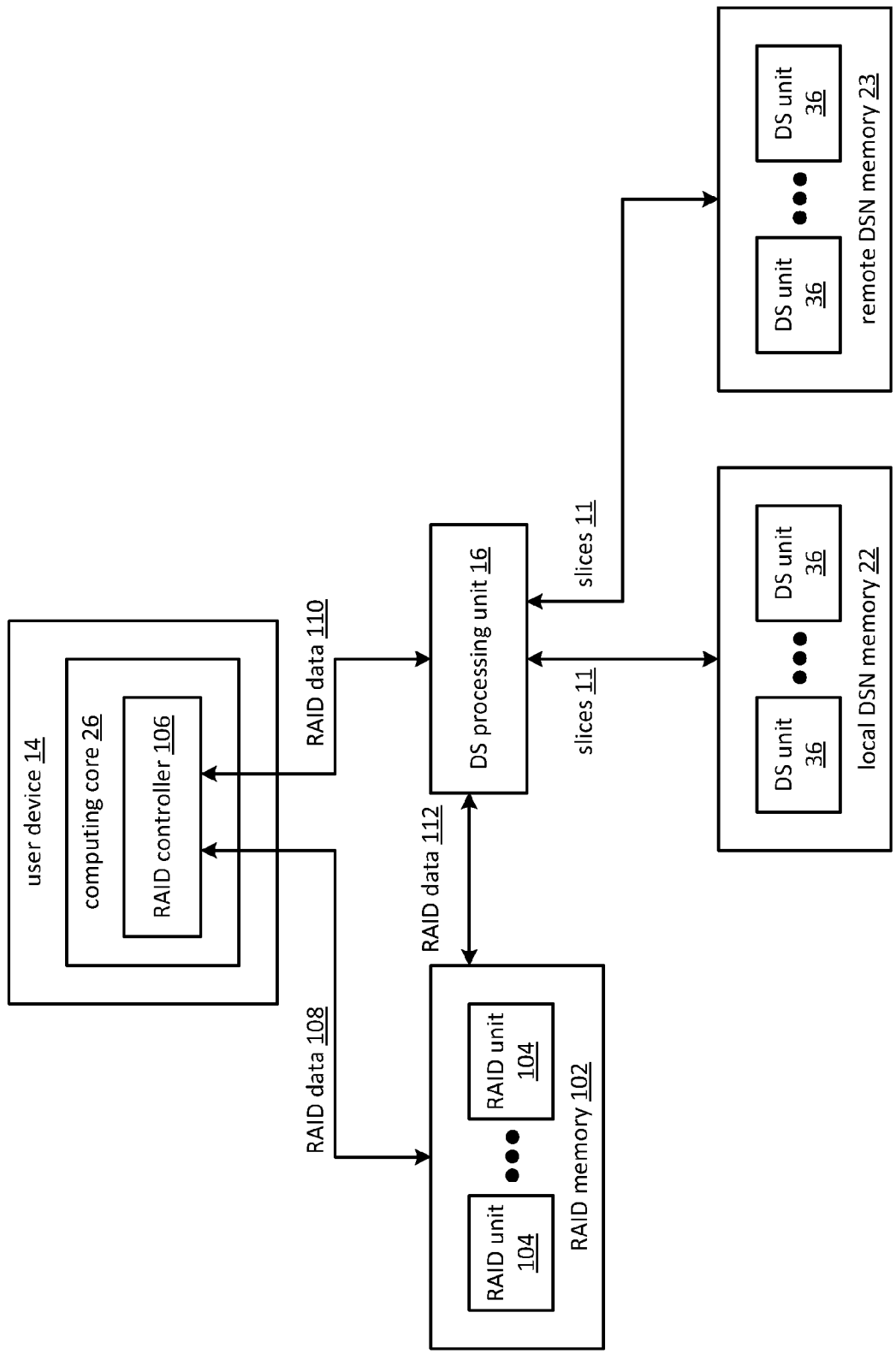
FIG. 11 is a schematic block diagram of another embodiment of a computing system in accordance with the present invention.

FIG. 11 is a schematic block diagram of another embodiment of a computing system that includes a user device 14, a dispersed storage (DS) processing unit 16, a redundant array of independent disks (RAID) memory 102, a local dispersed storage network (DSN) memory 22, and a remote DSN memory 23. The RAID memory 102 includes a plurality of RAID units 104. Note that the local DSN memory 22 and the remote DSN memory 23 include a plurality of dispersed storage (DS) units 36, wherein the DS units 36 of the local DSN memory 22 are deployed at one or more sites within local proximity (e.g., at a same site) to the DS processing unit 16 and/or the user device 14, and wherein the DS units 36 of the remote DSN memory 23 are deployed at one or more sites not within local proximity (e.g., not at the same site) to the DS processing unit 16 and/or the user device 14. User device 14 includes a computing core 26, wherein the computing core 26 includes a RAID controller 106. Alternatively, or in addition to, the user device 14 may include a DS processing as discussed with reference to FIG. 6A. The RAID controller 106 stores RAID data 108 in the RAID memory 102 and/or RAID data 110 in the local DSN memory 22 and/or remote DSN memory 23 via the DS processing unit 16.

The DS processing unit 16 facilitates at least three primary functions of the system. In a first primary function, the DS processing unit 16 facilitates storing RAID data 110 as encoded data slices 11 in the local DSN memory 22 and/or the remote DSN memory 23 (e.g., in response to a RAID data storage request from the RAID controller 106). In a second primary function, the DS processing unit 16 facilitates retrieving the encoded data slices 11 from the local DSN memory 22 and/or the remote DSN memory 23, dispersed storage error decoding encoded slices to produce RAID data, and sending the RAID data 110 to the RAID controller 106 (e.g., in response to a RAID data retrieval request from the RAID controller 106). In a third primary function, the DS processing unit 16 facilitates copying (e.g., backing up) RAID data 112 from the RAID memory 102 as encoded data slices 11 in the local DSN memory 22 and/or the remote DSN memory 23.

In an example of a data storing operation, the DS processing unit 16 receives RAID data 110 from the RAID controller 106, wherein the RAID data 110 includes a store RAID data command. The DS processing unit 16 determines which DSN memories to utilize based on matching storage requirements to the storage capabilities of the local and/or remote DSN memories 22-23. The DS processing unit 16 saves the selected memory location as a DSN memory indicator for subsequent use in a retrieval scenario. Next, the DS processing unit 16 determines a DS method. The DS processing unit 16 creates encoded data slices of the RAID data in accordance with the DS method. The DS processing unit 16 sends the encoded data slices with a store command to the local and/or remote DSN memories 22-23 for storage therein. The method to create encoded data slices based on the RAID data is discussed in greater detail with reference to FIG. 12.

In an example of data retrieval operation, the DS processing unit 16 receives RAID data 110 from the RAID controller 106, wherein the RAID data 110 includes a retrieve RAID data command. The DS processing unit 16 determines the DSN memory locations of encoded data slices corresponding to the requested RAID data based on where the desired encoded data slices were stored as indicated by the DSN memory indicator. The DS processing unit 16 determines which of the DSN memory locations to utilize based on one or more of the DSN memory locations of the encoded data slices, retrieval requirements, and DSN memory capabilities. The DS processing unit 16 retrieves the encoded data slices from the local DSN memory 22 and/or remote DSN memory 23 and determines the DS method. The DS processing unit 16 recovers RAID data from the retrieved encoded data slices in accordance with the DS method. The DS processing unit 16 sends the RAID data 110 to the RAID controller 106.

In an example of a data copying operation, the DS processing unit 16 sends RAID data 112 (e.g., including a retrieve RAID data command) to the RAID memory 102 to retrieve stored RAID data from the RAID memory 102. Note that the DS processing unit 16 communicates with the RAID memory 102 utilizing RAID commands as utilized by the RAID controller 106 to access the RAID memory 102. Next, the DS processing unit 16 receives RAID data 112 from the RAID memory 102. The DS processing unit 16 dispersed storage error encodes data of the RAID data 112 to produce encoded data slices. Next, the DS processing unit 16 determines which DSN memory to utilize based on a comparison of storage requirements to attributes of the DSN memories. The DS processing unit 16 sends the encoded data slices to the DSN memory 22 and/or the DSN memory 23 for storage therein in accordance with the DSN memory determination. As another example of data copying, the DS processing unit 16 retrieves encoded data slices from the DSN memory 22 and/or the DSN memory 23, dispersed storage error decodes the encoded data slices to produce data, transforms the data into RAID data, and sends the RAID data 112 to the RAID memory 102 for storage. As yet another example of data copying, the DS processing unit 16 retrieves the encoded data slices from one of the DSN memory 22 or the DSN memory 23 and stores the encoded data slices in the other DSN memory. The method to copy and/or backup RAID data is discussed in greater detail with reference to FIG. 13.

Figure 12:
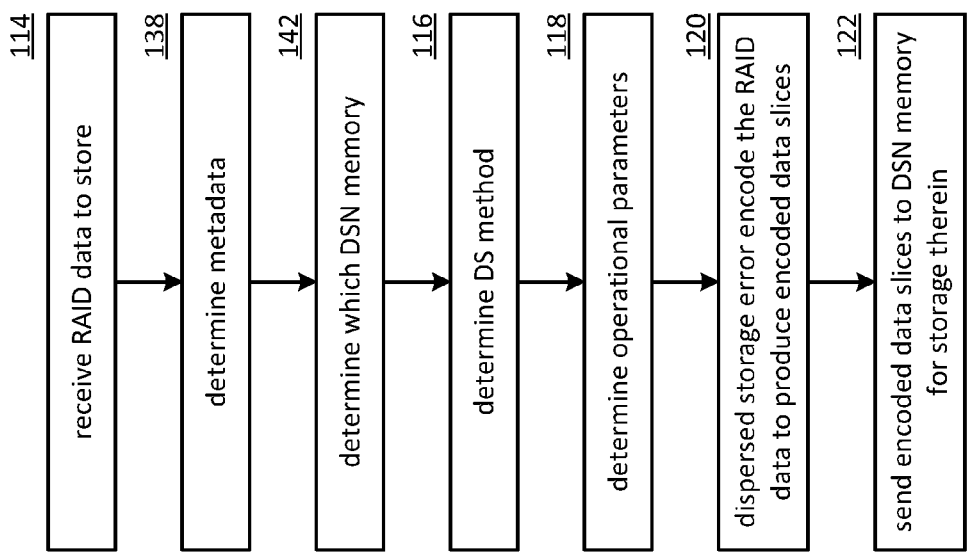
FIG. 12 is a flowchart illustrating another example of storing data in accordance with the present invention.

FIG. 12 is a flowchart illustrating another example of storing data, which includes many similar steps to FIGS. 7 and 10. The method begins with step 114 of FIG. 7 to receive redundant array of independent disks (RAID) data to store. The method continues with step 138 of FIG. 10 to determine metadata associated with the RAID data. The method continues at step 142 where a processing module determines which dispersed storage network (DSN) memory to utilize based on one or more of the metadata, the RAID data, a vault lookup, a command, a message, a predetermination, local DSN memory capabilities, remote DSN memory capabilities, and a comparison of requirements to DSN memory capabilities. For example, the processing module determines to utilize a remote DSN memory when a performance indicator indicates that reliability is favored over low access latency and the remote DSN memory has a high reliability capability. As another example, the processing module determines to utilize a local DSN memory when the performance indicator indicates that low access latency is favored over reliability and the local DSN memory has a low access latency capability. As yet another example, the processing module determines to utilize both the local DSN memory and the remote DSN memory when the performance indicator indicates that both low access latency and high reliability are required and that the local DSN memory has the capability of low access latency and the remote DSN memory has the capability of high reliability. The method continues with steps 116, 118, 120, and 122 of FIG. 7 to send the RAID data as encoded data slices to one or more of the determined DSN memories for storage therein.

Figure 13:
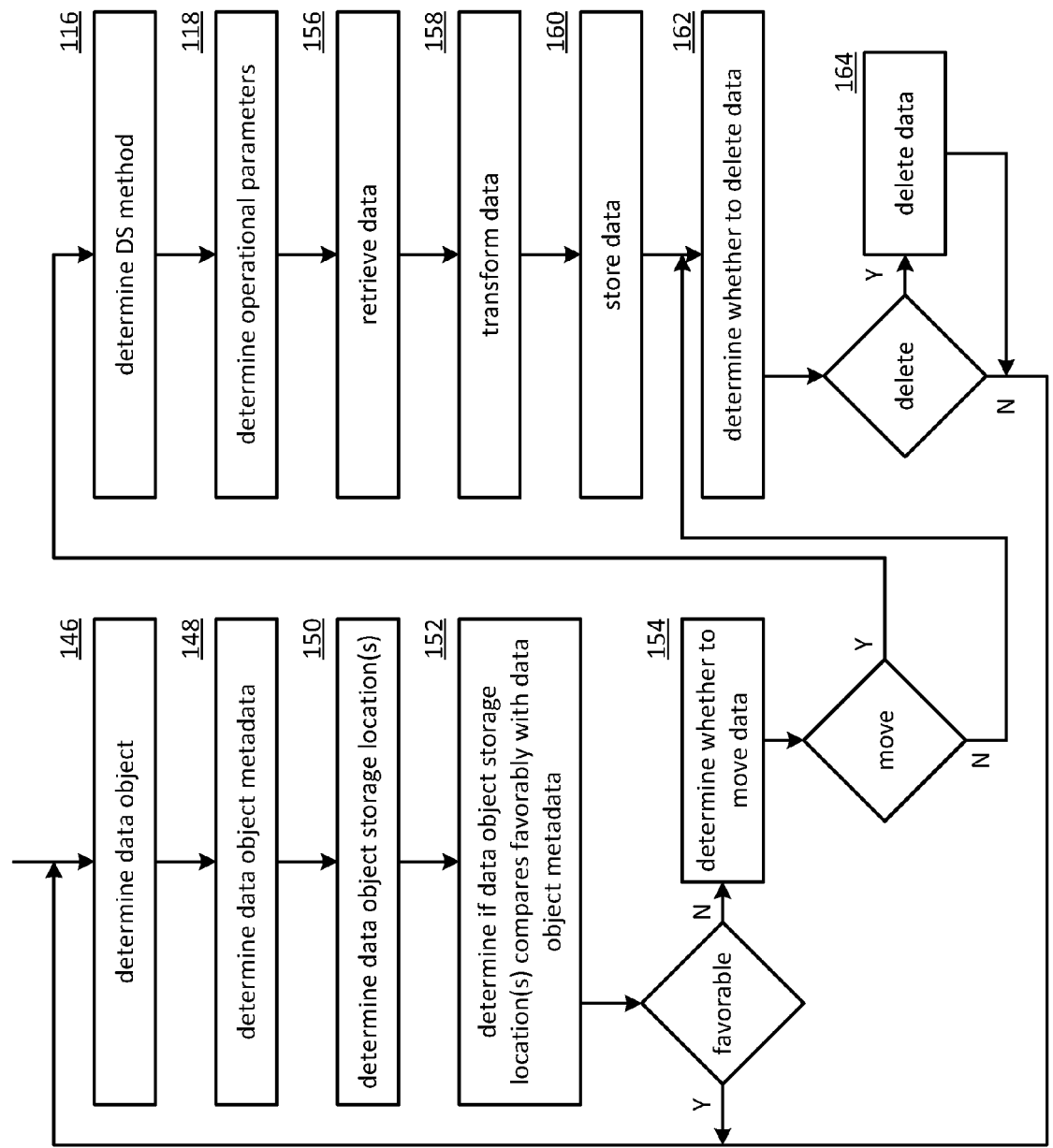
FIG. 13 is a flowchart illustrating another example of copying data in accordance with the present invention.

FIG. 13 is a flowchart illustrating another example of copying data, which includes similar steps to FIG. 7. The method begins with step 146 where a processing module determines a data object name of a data object to consider moving and/or deleting. Such a determination may be based on one or more of which data object was most recently considered, a query, a list, a redundant array of independent disks (RAID) data frequency of access indicator, a particular RAID unit, a particular physical memory, a particular RAID memory, an elapsed time since a last retrieval and storage of same RAID data, a command, a message, a predetermination, a vault lookup, and an error message.

The method continues at step 148 where the processing module determines data object metadata, wherein the data object metadata may include one or more of a time indicator to move the data object, an expected access frequency indicator, an access frequency threshold, a backup frequency indicator, an age threshold, a cost indicator, a data type, a data size, a priority indicator, a security indicator, a performance indicator, a user identifier (ID), a group ID, a timestamp, and other descriptors to describe the data. Such a determination may be based on one or more of a vault lookup, a query, a command, a message, a predetermination, an access frequency record, a data object name, a data object, a data object size, a data type, a data block, parity information, a user ID, RAID unit information, disk drive information, address information, memory information, a command, RAID method information and a request. For example, the processing module determines the data object metadata to include a time indicator to move the data object such that the data object should be moved from RAID memory to local DSN memory after 10 days from the initial storage to the RAID memory, based on a vault lookup for the data object.

The method continues at step 150 where the processing module determines the data object storage location(s) based on one or more of a memory indicator, the data object metadata, a vault lookup, a list, a command, a message, a predetermination, local dispersed storage network (DSN) memory capabilities, remote DSN memory capabilities, and a comparison of requirements to the DSN memory capabilities. The method continues at step 152 where the processing module determines if the data object storage location(s) compare favorably with the data object metadata. For example, the processing module determines if the data object storage locations still meet the requirements for storage of the data object. As a specific example, the processing module determines a favorable comparison when the storage locations still meet the requirements of the data object in regards to access latency of under 100 ms.

As yet another specific example, the processing module determines an unfavorable comparison when the storage locations do not meet the requirements of the data object with regards to storage reliability of twelve nines (e.g., 99.9999999999%) further requiring that the data object be moved to one or more other storage locations (e.g., moving the data from one memory type to another memory type). In an instance, the processing module determines that the comparison is unfavorable when the access frequency is below an access frequency threshold such that it is no longer required that the data object be stored in the RAID memory. In another instance, the processing module determines that the comparison is unfavorable when the performance requirement no longer includes the latency delivered by the RAID memory and/or the local DSN memory but the high reliability of the remote DSN memory is still required. The method repeats back to step 146 when the processing module determines that the data object storage location(s) compares favorably with the data object metadata. The method continues to step 154 when the processing module determines that the data object storage location(s) do not compare favorably with the data object metadata.

The method continues at step 154 where the processing module determines whether to move the data from at least one memory type to at least one of another memory type based on one or more of the data object, the data object metadata, the data object storage locations, storage requirements, capabilities of the RAID memory, capabilities of the local DSN memory, capabilities of the remote DSN memory, the comparison of the data object storage locations to the data object metadata, a comparison of the storage requirements to the memory capabilities, a vault lookup, a list, a predetermination, a command, a message, a query, and/or an error message. For example, the processing module determines to move the data object from the RAID memory to the local DSN memory when the local DSN memory provides the required performance at a cost lower than the RAID memory. As a specific example, the processing module determines to move all RAID blocks of all of the RAID data of all of the data objects stored in the RAID memory to the local and/or remote DSN memory when the processing module determines that the RAID memory is failing too often as indicated by the memory performance indicator, or is too costly, and/or if the local and/or remote DSN memory meets the storage requirements of all of the data objects.

As another example, the processing module determines to move the data object from the local DSN memory to the remote DSN memory when the remote DSN memory meets the performance requirements at a lower cost than the local DSN memory. As yet another example, the processing module determines to move the data object from the remote DSN memory to the RAID memory when the frequency of access and latency performance requirements have become more stringent and are met by the RAID memory even though the cost is higher than continuing to utilize the remote DSN memory. The method branches to step 162 when the processing module determines to not move the data. The method continues to step 116 of FIG. 7 when the processing module determines to move the data.

The method continues with steps 116 and 118 of FIG. 7 to determine a DS method and error coded dispersal storage function parameters (e.g., operational parameters). The method continues at step 156 where the processing module retrieves the data as RAID data from the RAID memory in accordance with the DS method and operational parameters when the DS processing previously determined to move data from the RAID memory (e.g., a current storage location of the data object). The processing module retrieves data as encoded data slices from a DSN memory in accordance with the DS method and operational parameters when the processing module previously determined to move data from one of the local DSN memory and/or the remote DSN memory (e.g., a current storage location of the data object).

The method continues at step 158 where the processing module transforms the data when the processing module determines to move the data from one type of memory to another type of memory. For example, the processing module transforms RAID data to encoded data slices by dispersed storage error encoding the RAID data to produce the encoded data slices when the processing module determines to move data from the RAID memory to the local DSN memory. As another example, the processing module transforms the encoded data slices to RAID data by dispersed storage error decoding the encoded data slices to produce the RAID data when the processing module determines to move data from the remote DSN memory to the RAID memory. As yet another example, the processing module transforms encoded data slices from a first set of operational parameters to encoded data slices utilizing a second set of operational parameters when the processing module determines to move encoded data slices from the local DSN memory to the remote DSN memory utilizing a different set of operational parameters.

The method continues at step 160 where the processing module stores the data in the memory that the processing module determined to move the data to. For example, the processing module sends the encoded data slices created based on the RAID data from the RAID memory with a store slice command to the local DSN memory to store the encoded data slices in the local DSN memory. As another example, the processing module sends RAID blocks of the RAID data created based on the encoded data slices from the remote DSN memory with a store RAID data command to the RAID memory to store the RAID data in the RAID memory.

The method continues at step 162 where the processing module determines whether to delete data based on the results of the previous move determination, the data object, the data object metadata, the data object storage locations, storage requirements, capabilities of the RAID memory, capabilities of the local DSN memory, capabilities of the remote DSN memory, the comparison of the data object storage locations to the data object metadata, a comparison of the storage requirements to the memory capabilities, a vault lookup, a list, a predetermination, a command, a message, a query, and an error message. For example, the processing module determines to delete the data object from the RAID memory when the processing module determines that the local DSN memory provides the required performance at a cost lower than the RAID memory and when the data object has been stored in the local DSN memory.

As another example, the processing module determines to delete the data object from the local DSN memory (e.g., deleting encoded data slices) when the processing module determines that the remote DSN memory meets the performance requirements at a lower cost than the local DSN memory and the data object has been moved to the remote DSN memory. As yet another example, the processing module determines to delete the data object from the remote DSN memory when the processing module determines that the frequency of access and latency performance requirements have become more stringent and are met by the RAID memory even though the cost is higher than continuing to utilize the remote DSN memory and the data object has been moved to the RAID memory. The method repeats back to step 146 when the processing module determines to not delete data. The method continues to step 164 where the processing module deletes the data from at least one memory when the processing module determines to delete data. The processing module deletes RAID blocks of the RAID data in the RAID memory corresponding to the data object, encoded data slices from the local DSN memory, and encoded data slices from the remote DSN memory. For example, the processing module executes the deletion by sending a delete data command to the memory. The method repeats back to step 146 where the processing module determines the next data object to consider moving or deleting.

Figure 14:
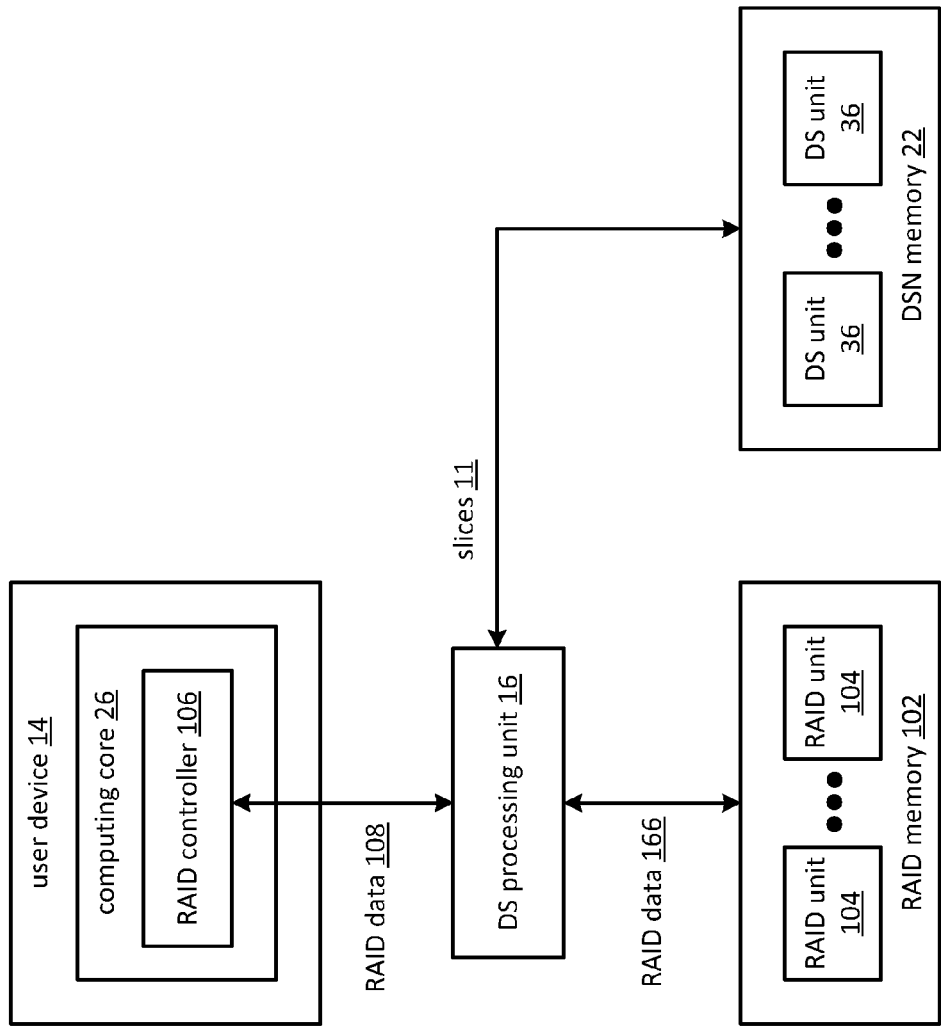
FIG. 14 is a schematic block diagram of another embodiment of a computing system in accordance with the present invention.

FIG. 14 is a schematic block diagram of another embodiment of a computing system that includes at least one user device 14, at least one redundant array of independent disks (RAID) memory 102, at least one dispersed storage (DS) processing unit 16, and at least one dispersed storage network (DSN) memory 22. Note that the DSN memory 22 includes a plurality of DS units 36, wherein the DS units 36 may be deployed at one or more sites. User device 14 includes a computing core 26, wherein the computing core 26 includes a RAID controller 106. Alternatively, or in addition to, the user device 14 may include a DS processing as discussed with reference to FIG. 6A. The RAID memory 102 includes a plurality of RAID units 104. The RAID controller 106 stores a portion of RAID data 108 in the RAID memory 102 as RAID data 166 via the DS processing unit 16 and/or a portion of RAID data 110 in the DSN memory 22 via the DS processing unit 16.

The DS processing unit 16 facilitates at least three primary functions of the system. In a first primary function, the DS processing unit 16 facilitates storing RAID data 108 as encoded data slices 11 in the DSN memory 22 (e.g., in response to a RAID data storage request from the RAID controller 106) and/or as RAID data 166 in the RAID memory 102. In a second primary function, the DS processing unit 16 facilitates retrieving the encoded data slices 11 from the DSN memory 22 and dispersed storage error decoding encoded slices to produce recovered RAID data, and/or retrieving RAID data 166 from the RAID memory 102 to produce retrieved RAID data. Next, the processing module sends the recovered RAID data and/or the retrieved rate data as the RAID data 108 to the RAID controller 106 (e.g., in response to a RAID data retrieval request from the RAID controller 106). In a third primary function, the DS processing unit 16 facilitates migrating data between the RAID memory 102 and the DSN memory 22.

In an example of a data storing operation, the DS processing unit 16 receives RAID data 108 from the RAID controller 106, wherein the RAID data 108 includes a store RAID data command. The DS processing unit 16 determines which memories to utilize based on matching storage requirements to the storage capabilities of the RAID memory 102 and the DSN memory 22. The DS processing unit 16 saves the selected memory location as a memory indicator for subsequent use in a retrieval scenario. Next, the DS processing unit 16 determines a DS method when storing a portion of the RAID data 108 as encoded data slices. The DS processing unit 16 creates encoded data slices of the RAID data in accordance with the DS method when storing a portion of the RAID data 108 as encoded data slices. The DS processing unit 16 sends the encoded data slices with a store command to the DSN memory for storage therein. The DS processing unit 16 stores at least a portion of the RAID data 108 as RAID data 166 in the RAID memory 102 when storing another portion of the RAID data 108 as RAID data. The method to store RAID data is discussed in greater detail with reference to FIGS. 15, 18, and 20A.

In an example of data retrieval operation, the DS processing unit 16 receives RAID data 108 from the RAID controller 106, wherein the RAID data 108 includes a retrieve RAID data request. The DS processing unit 16 determines the memory locations of data associated with the retrieve RAID data request. For example, the processing module determines the encoded data slices 11 stored in the DSN memory 22 corresponding to a portion of the requested RAID data based on where the desired data stored as indicated by the memory indicator. The DS processing unit 16 retrieves the encoded data slices from the DSN memory 22 when the DSN memory 22 stores at least a portion of the requested data. Next, the DS processing unit 16 determines the DS method and recovers RAID data from the retrieved encoded data slices in accordance with the DS method to produce recovered RAID data. The DS processing unit 16 retrieves a portion of the RAID data as retrieved RAID data 166 from the RAID memory 102 when the processing module determines that a portion of requested data is stored in the RAID memory 102. Next, the DS processing unit 16 aggregates the recovered RAID data from the DSN memory 22 and the retrieved RAID data from the RAID memory 102 to produce RAID data. The DS processing unit 16 sends the RAID data as RAID data 108 to the RAID controller 106 in response to the RAID data retrieval request. The method to retrieve RAID data is discussed in greater detail with reference to FIGS. 16, 19, and 21.

In an example of a data migration operation, the DS processing unit 16 sends RAID data 166 (e.g., including a retrieve RAID data request) to the RAID memory 102 to retrieve stored RAID data from the RAID memory 102 when the DS processing unit 16 determines to migrate RAID data from the RAID memory 102 to the DSN memory 22 as encoded data slices. Next, the DS processing unit 16 receives RAID data 166 from the RAID memory 102. The DS processing unit 16 dispersed storage error encodes data of the RAID data 166 to produce encoded data slices. Next, the DS processing unit 16 sends the encoded data slices to the DSN memory 22 for storage therein. As another example of data migration, the DS processing unit 16 retrieves encoded data slices from the DSN memory 22, dispersed storage error decodes the encoded data slices to produce data, transforms the data into RAID data, and sends the RAID data 166 to the RAID memory 102 for storage therein. As yet another example of data migration, the DS processing unit 16 retrieves the RAID data 166 from the RAID memory 102, dispersed storage error encodes the RAID data to produce encoded data slices, and sends the encoded data slices to RAID memory 102 for storage therein. The method to migrate RAID data is discussed in greater detail with reference to FIG. 20B.

In an example of rebuilding RAID data, the DS processing unit 16 sends a RAID data request command to the RAID memory 102 to retrieve RAID data 166 from the RAID memory 102. The DS processing unit 16 receives the retrieved RAID data 166 from the RAID memory 102 and determines if the RAID data 166 has errors based on comparing stored parity information with calculated parity information of the retrieved RAID data 166. The DS processing unit 16 rebuilds the RAID data 166 and stores the rebuilt RAID data as RAID data 166 in the RAID memory 102 when the DS processing unit 16 determines that the retrieved RAID data 166 has one or more errors and when the errors are correctable based on RAID parity data. As a specific example, the DS processing unit 16 creates the rebuilt RAID data based on the data and parity information retrieved from the RAID memory 102. As another specific example, the DS processing unit 16 creates the rebuilt RAID data based on RAID data recovered from retrieved encoded data slices from the DSN memory 22 when the encoded data slices correspond to the RAID data (e.g., a backup copy). The method to rebuild RAID data is discussed in greater detail with reference to FIG. 17.

Figure 15:
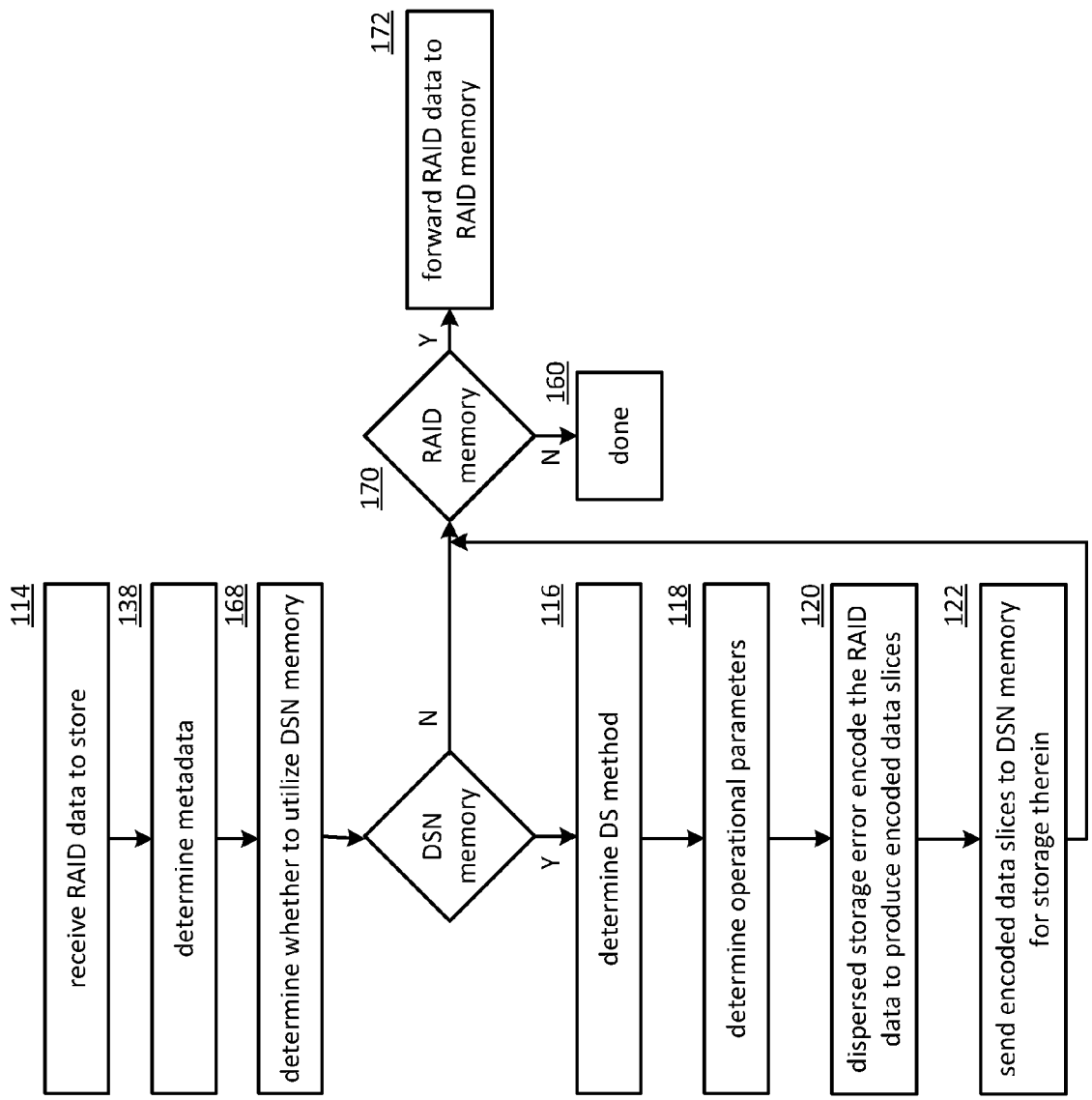
FIG. 15 is a flowchart illustrating another example of storing data in accordance with the present invention.

FIG. 15 is a flowchart illustrating another example of storing data, which includes many similar steps to FIGS. 7 and 10. The method begins with step 114 of FIG. 7 to receive redundant array of independent disks (RAID) data to store and continues with step 138 of FIG. 10 to determine metadata of the RAID data. The method continues at step 168 where a processing module determines whether to utilize a dispersed storage network (DSN) memory by determining whether to store the RAID data in at least one of a RAID format and in a DSN format including storing the RAID data in the RAID format and in the DSN format, storing the RAID data in the DSN format only, and storing the RAID data in the RAID format only. Such a determination may be based on one or more of the metadata, the RAID data, a vault lookup, a command, a message, a predetermination, DSN memory capabilities, RAID memory capabilities, and a comparison of requirements to RAID memory and DSN memory capabilities. Note that the processing module may save the determination choice in a memory indicator that is stored in one or more of the RAID memory, the DSN memory, and a DSN user vault to facilitate a subsequent retrieval of the RAID data.

For example, the processing module determines to utilize the DSN memory only when the performance indicator indicates that reliability is favored over low access latency and the DSN memory has a high reliability capability. As another example, the processing module determines to utilize the RAID memory only when the performance indicator indicates that low access latency is favored over reliability and the RAID memory has a low access latency capability. As yet another example, the processing module determines to utilize both the DSN memory and the RAID memory when the performance indicator indicates that both low access latency and high reliability is required and that the RAID memory has the capability of low access latency and the DSN memory has the capability of high reliability. The method branches to step 170 when the processing module determines to not utilize the DSN memory. The method continues to step 116 of FIG. 7 when the processing module determines to utilize the DSN memory.

The method continues with steps 116 and 118 of FIG. 7 when the processing module determines to utilize the DSN memory. The method continues with step 120 of FIG. 7 where the processing module dispersed storage error encodes the RAID data to produce encoded data slices (e.g., a set of encoded data slices, a plurality of sets of encoded data slices). As a specific example, the processing module converts at least a portion of the RAID data into at least one set of encoded data slices when at least a portion of the RAID data is to be stored in the DSN format. As another specific example, the processing module converts the RAID data into a plurality of sets of encoded data slices. The method continues with step 122 of FIG. 7 where the processing module outputs (e.g., sends) the encoded data slices to the DSN memory for storage therein. Alternatively, the processing module outputs at least one set of the plurality of sets of encoded data slices to the DSN memory and outputs at least one other set of the plurality of sets of encoded data slices to a RAID memory. Alternatively, or in addition to, the processing module converts the at least one other set of the plurality of sets of encoded data slices into the RAID format prior to outputting to the RAID memory. In yet another alternative, the processing module outputs a subset of each of the plurality of sets of encoded data slices to the DSN memory and outputs remaining encoded data slices of each of the plurality of sets of encoded data slices to a RAID memory.

The method continues at step 170 where the processing module determines whether to utilize the RAID memory based on previous memory determination. The method branches to an end at step 160 when the processing module determines to not utilize the RAID memory. The method continues to step 172 when the processing module determines to utilize the RAID memory. The method continues at step 172 where the processing module outputs the RAID data to the RAID memory (e.g., forwarding at least a portion of the RAID data to the RAID memory to store the RAID data in the RAID memory, converting encoded data slices into RAID data and sending the RAID data to the RAID memory). Alternatively, or in addition to, the processing module determines whether to convert the RAID data from a first RAID format to a second RAID format when a remaining portion of the RAID data is to be stored in the RAID format and converting the RAID data from the first RAID format to the second RAID format when the RAID data is to be converted from the first RAID format to the second RAID format. Such a determination may be based on one or more of a storage requirement and a RAID memory capability.

Figure 16:
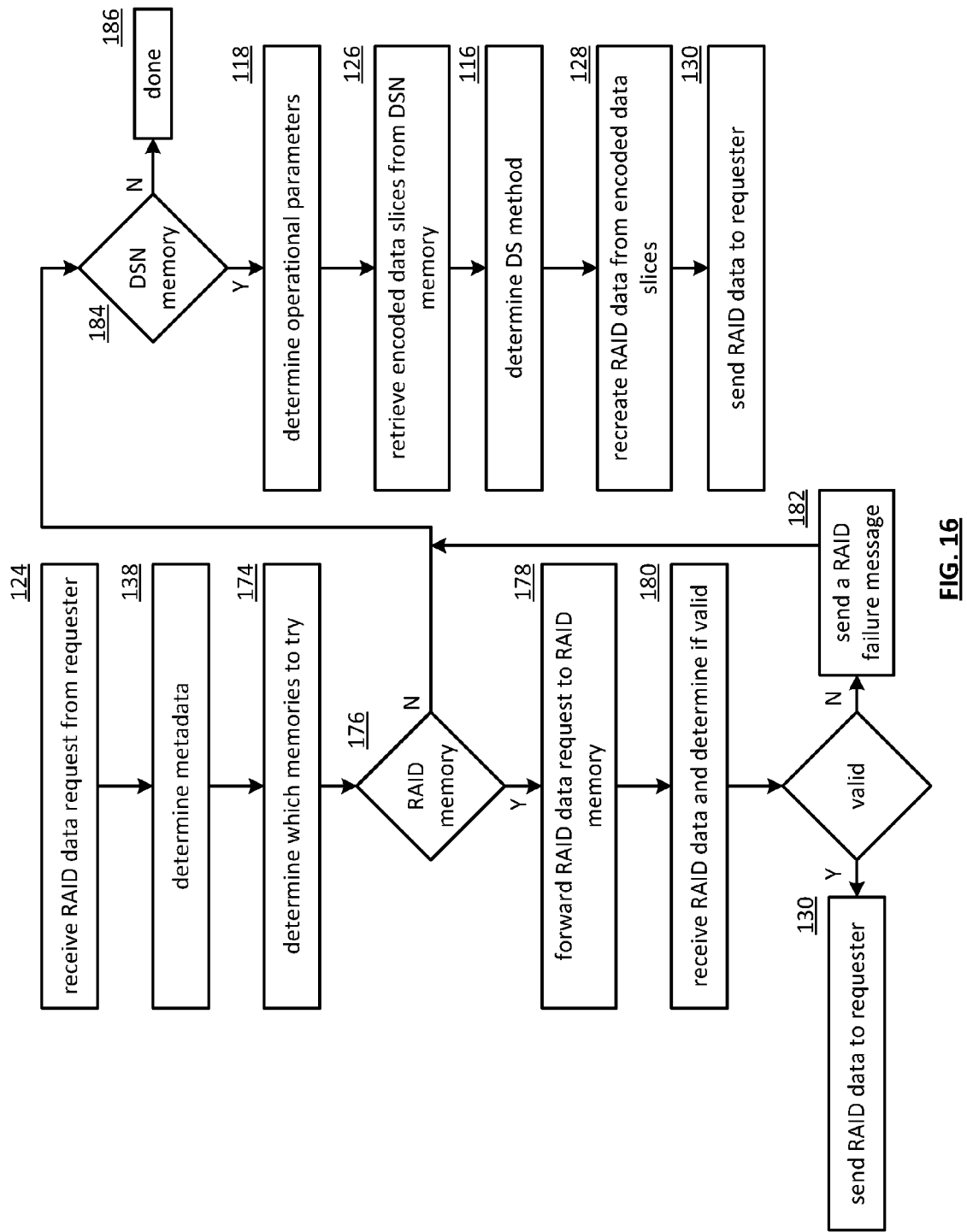
FIG. 16 is a flowchart illustrating another example of retrieving data in accordance with the present invention.

FIG. 16 is a flowchart illustrating another example of retrieving data, which includes many similar steps to FIGS. 7, 8, and 10. The method begins with step 124 of FIG. 8 to receive a redundant array of independent disks (RAID) data request from a requester and continues with step 138 of FIG. 10 to determine metadata. The method continues at step 174 where a processing module determines which memory to try to retrieve the RAID data from (e.g., determining whether to retrieve the RAID data from at least one of a RAID memory and a dispersed storage network (DSN) memory). Such a determination may include determining formatting of storing the RAID data and determining to retrieve the RAID data from the RAID memory based on a desired retrieval speed. The determination may be based on one or more of the metadata, a memory indicator, the RAID data, a vault lookup, a command, a message, a predetermination, DSN memory capabilities, RAID memory capabilities, and a comparison of requirements to the RAID memory and DSN memory capabilities.

For example, the processing module determines to retrieve from the DSN memory when the performance indicator indicates that reliability is favored over low access latency and the DSN memory has a high reliability capability and includes the desired RAID data. As another example, the processing module determines to retrieve from the RAID memory when the performance indicator indicates that low access latency is favored over reliability and the RAID memory has a low access latency capability and includes the desired RAID data. As yet another example, the processing module determines to retrieve from both the DSN memory and the RAID memory when the performance indicator indicates that both low access latency and high reliability is required and that the RAID memory has the capability of low access latency and the DSN memory has the capability of high reliability and further when the RAID memory has a failure in the retrieval process. The method continues at step 176 where the processing module determines whether to retrieve from the RAID memory based on the memory determination of step 174. The method branches to step 184 when the processing module determines not to retrieve from the RAID memory. The method continues to step 178 when the processing module determines to retrieve from the RAID memory.

The method continues at step 178 where the processing module forwards the RAID data request to the RAID memory to retrieve the RAID data from the RAID memory. Next, at step 180, the processing module receives the RAID data. Alternatively, the processing module retrieves a remaining portion of the RAID data from the RAID memory (e.g., when a portion of the RAID data is stored as encoded data slices) and merges the remaining portion of the RAID data with the at least a portion of the RAID data to produce the RAID data. Next, at step 180, the processing module determines whether the received RAID data is valid based on comparing stored parity information to calculated parity information. The processing module determines that the received RAID data is valid when the calculated parity information is substantially the same as the stored parity information. The method ends with step 130 of FIG. 8 when the processing module determines that the RAID data is valid. The method continues to step 182 when the processing module determines that the RAID data is not valid. The method continues at step 182 where the processing module sends a RAID failure message to one or more of a RAID controller, a DS managing unit, a user device, wherein the RAID failure message indicates that the RAID data is not valid and may not be correctable utilizing only data stored within the RAID memory. The method branches to step 184. Note that the DSN memory may contain a backup copy of the data of the requested RAID data.

The method continues at step 184 where the processing module determines whether to retrieve data from the DSN memory based on the previous memory determination and/or when retrieved RAID data from the RAID memory is not valid and not correctable. For example, the processing module determines to retrieve data from the DSN memory when the desired data exists in the DSN memory and attempted retrieval of the data from the RAID memory resulted in RAID data that was not valid. As another example, the processing module determines to retrieve the data from the DSN memory when the data was not previously stored in the RAID memory and when data was previously stored in the DSN memory. The method ends at step 186 when the processing module determines to not read data from the DSN memory. The method continues to step 118 of FIG. 7 when the processing module determines to read data from the DSN memory.

The method continues with step 118 of FIG. 7 to determine error coding dispersal storage function parameters. The method continues with step 126 of FIG. 8 to retrieve encoded data slices from the DSN memory. The method continues with step 116 of FIG. 7 to determine a dispersed storage (DS) method. The method continues with step 128 of FIG. 8 to re-create RAID data from the encoded data slices. Note that the processing module converts at least one set of encoded data slices into at least a portion of the RAID data when at least a portion of the RAID data is to be retrieved from the DSN memory. The method continues with step 130 of FIG. 8 to send RAID data to the requester. Note that the processing module outputs the at least a portion of the RAID data when retrieving the at least the portion of the RAID data from the DSN memory.

Figure 17:
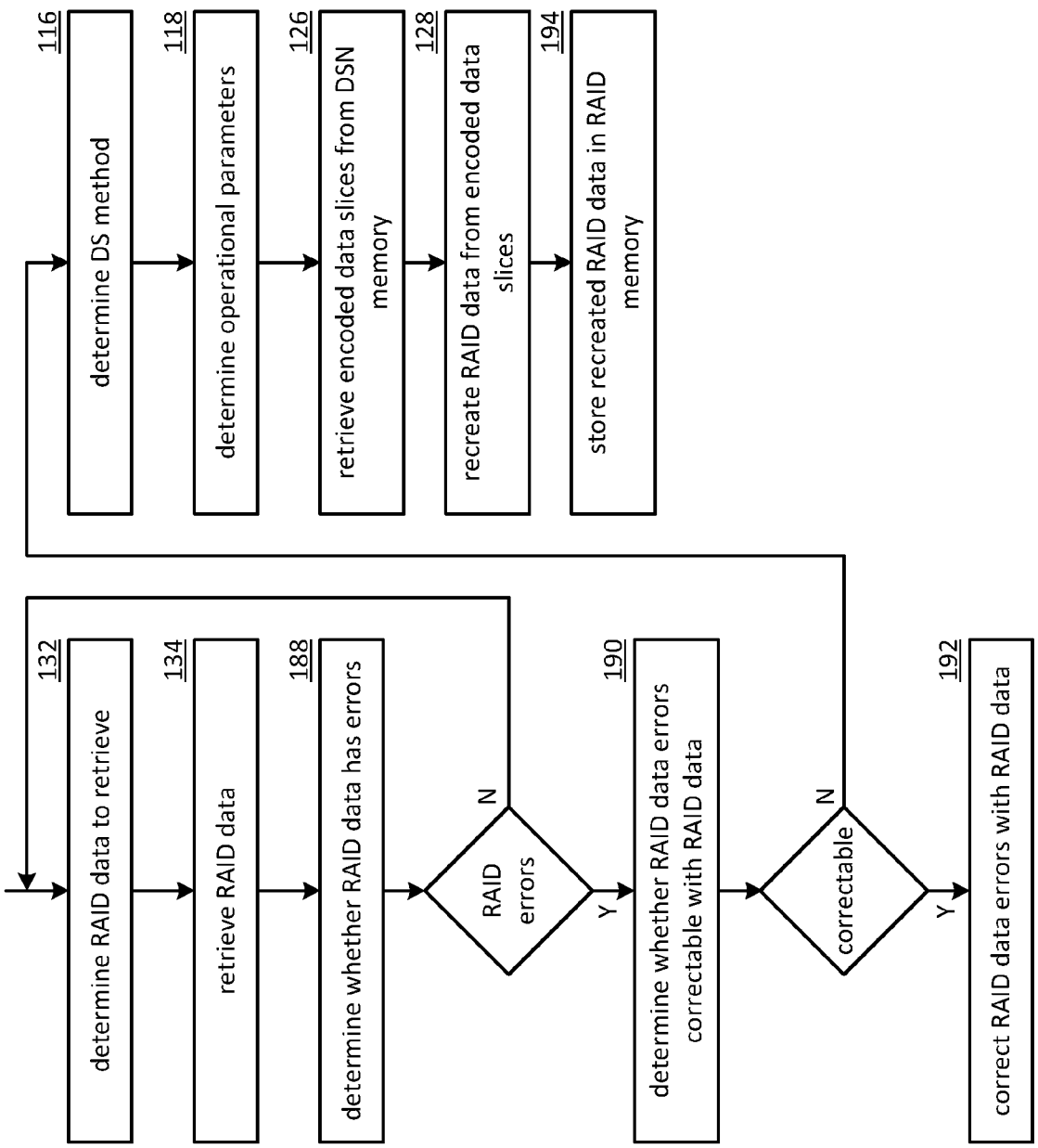
FIG. 17 is a flowchart illustrating an example of rebuilding data in accordance with the present invention.

FIG. 17 is a flowchart illustrating another example of rebuilding data, which includes many similar steps to FIGS. 7, 8, and 9B. The method begins with steps 132-134 of FIG. 9B to retrieve redundant array of independent disks (RAID) data for rebuilding consideration and then continues with step 188 where a processing module determines whether the RAID data has errors. Such a determination includes comparing stored parity to calculated parity of the RAID data. For example, the processing module determines that the RAID data does not have errors when the stored parity is substantially the same as the calculated parity of the RAID data. The method repeats back to step 132 where the processing module determines the next portion of the RAID data to retrieve and consider for rebuilding when the processing module determines that the RAID data does not have errors. The method continues to step 190 when the processing module determines that the RAID data has errors.

The method continues at step 190 where the processing module determines whether the RAID data errors are correctable with RAID data from RAID memory. For example, the processing module determines that the RAID data errors are correctable when there are sufficient good RAID block data blocks and RAID parity data blocks to re-create the original data in accordance with a RAID method. The method branches to the step 116 of FIG. 7 when the processing module determines that the RAID data errors are not correctable with the RAID data. Note that in this scenario the processing module attempts to rebuild the uncorrectable RAID data by retrieving a backup copy of the data from a dispersed storage network (DSN) memory. The method continues to step 192 when the processing module determines that the RAID data errors are correctable with the RAID data. The method continues at step 192 where the processing module corrects the RAID data errors utilizing RAID data in accordance with the RAID method storing corrected RAID data in the RAID memory The method continues with steps 116-118 of FIG. 7 and then continues with steps 126-128 of FIG. 8 to produce re-created RAID data from encoded data slices retrieved from the DSN memory. The method continues at step 194 where the processing module stores the re-created RAID data in the RAID memory by sending the RAID data to the RAID memory with a store command.

Figure 18A:
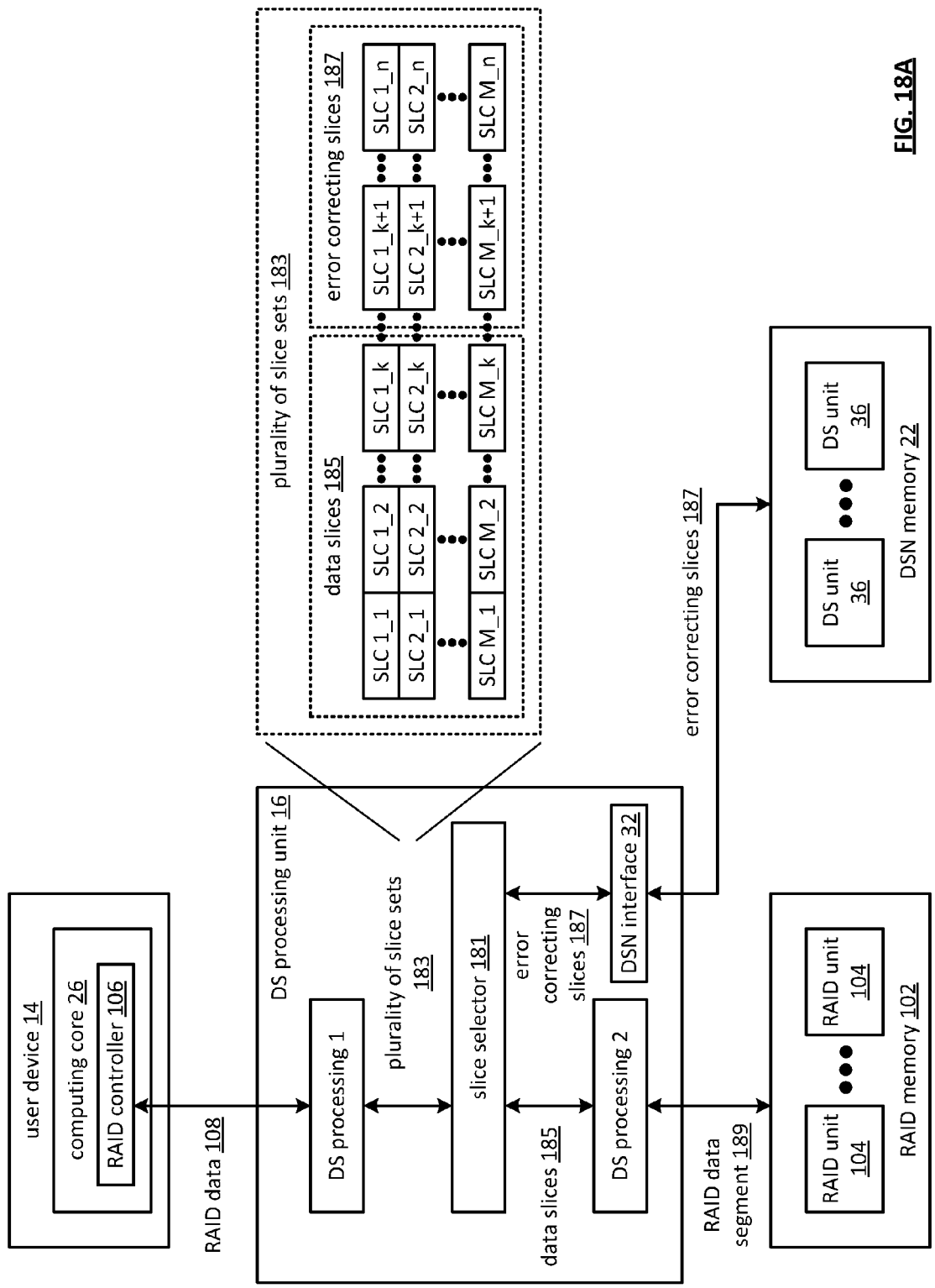
FIG. 18A is a schematic block diagram of a dispersed storage network (DSN) in accordance with the present invention.

FIG. 18A is a schematic block diagram of a dispersed storage network (DSN) that includes the user device 14 of FIG. 14, the DS processing unit 16 of FIG. 14, the redundant array of independent discs (RAID) memory 102 of FIG. 14, and the DSN memory 22 of FIG. 14. The user device 14 includes the computing core 26 of FIG. 2. The computing core 26 includes the RAID controller 106 of FIG. 14. The RAID memory 102 includes the plurality of RAID units 104 of FIG. 14. The DSN memory 22 includes the plurality of dispersed storage (DS) units 36 of FIG. 14. The DS processing unit 16 includes a DS processing 1, a slice selector 181, a DS processing 2, and the DSN interface 32 of FIG. 1. The DS processing 1 and 2 may be implemented utilizing the DS processing 34 of FIG. 1.

The DSN functions to store data in one or more of the RAID memory 102 and the DSN memory 22. In particular, the DSN functions to store RAID data 108 from the user device 14 and the one or more of the RAID memory 102 and the DSN memory 22, where the RAID controller 106 produces the data in a RAID format. In an example of operation, the DS processing unit 16 receives the data in the RAID format as the RAID data 108.

Having received the RAID data 108, the DS processing 1 converts from the RAID format to an original format of the data. For example, the DS processing 1 disaggregates RAID data blocks from the RAID data 108. Having converted from the RAID format to the original format of the data, the DS processing 1 dispersed storage error encodes a plurality of M data segments of the data in the original format to produce a plurality of sets of encoded data slices 183, where a data segment of the data in the original format is dispersed storage error encoded to produce a set of n encoded data slices of the plurality of sets of encoded data slices (e.g., slice 1_1 through slice 1_n for a first data segment). The set of encoded data slices includes a decode threshold sub-set of encoded data slices and an error correcting sub-set of encoded data slices. Hereafter, the decode threshold sub-set of encoded data slices may be referred to interchangeably as data slices 185 and the error correcting sub-set of encoded data slices may be referred to interchangeably as error correcting slices 187.

Having produced the set of encoded data slices, the slice selector 181 selects the decode threshold sub-set of encoded data slices 185 for further processing by the DS processing 2. The DS processing 2 converts the decode threshold sub-set of encoded data slices 185 into a RAID formatted data segment 189. As a specific example, the DS processing 2 produces the RAID formatted data segment 189 by generating data blocks (e.g., RAID data blocks) from the decode threshold sub-set of encoded data slices 185 and generating a parity data block from the data blocks. Having generated the RAID data segment 189, the DS processing 2 stores the RAID formatted data segment 189 in the RAID memory 102.

Having stored the RAID formatted data segment 189 in the RAID memory 102, the DS processing unit 16 stores at least some of the data slices 185 and the error correcting slices 187 in the DSN memory 22. As a specific example, the slice selector 181 stores, via the DSN interface 32, at least the error correcting sub-set of encoded data slices 187 in DSN memory 22. As another specific example, the slice selector 181 stores, via the DSN interface 32, the set of encoded data slices of the plurality of sets 183 in the DSN memory 22. When storing the set of encoded data slices in the DSN memory 22, for a read request to the data segment, the DS processing unit 16 retrieves from the RAID memory 102 while RAID memory failures are below a first level and retrieves, via the DSN interface 32, from the DSN memory 22 when the RAID memory failures are above a second level.

The DS processing unit 16 further functions to update a storage failure within the RAID memory 102. In an example of operation, the DS processing 2 detects a failure within the RAID memory 102 that adversely affects storage of one or more of the data blocks and the parity data block (e.g., detecting corruption of one of the data blocks, detecting a missing data block). Having detected the failure, the DS processing 2 determines whether to repair the one or more of the data blocks and the parity data block using RAID rebuilding or DSN rebuilding. For example, the DS processing 2 determines to utilize the RAID rebuilding when sufficient number of other data blocks and the parity data block are available to support the RAID rebuilding. As another example, the DS processing 2 determines to use the DSN rebuilding when the sufficient number of other data blocks and the parity data block are not available to support the RAID rebuilding.

When the DSN rebuilding is determined, the DS processing 2 retrieves the data blocks from the RAID memory that were not adversely affected. The slice selector 181 retrieves, via the DSN interface 32, the at least the error correcting sub-set of encoded data slices 187 from the DSN memory 22. The DS processing 1 reproduces the data segment having the original format of the data from the data blocks from the RAID memory 22 that were not adversely affected and the at least the error correcting sub-set of encoded data slices 187.

Having reproduced the data segment having the original format of the data, the DS processing unit 16 stores the recovered data segment. As a specific example, the DS processing 2 converts convert the recovered data segment having the original format of the data into the RAID formatted data segment and stores the RAID formatted data segment in the RAID memory 22. As another specific example, the DS processing 1 dispersed storage error encodes the recovered data segment having the original format of the data to produce one or more new encoded data slices and stores, via the DSN interface 32, the one or more new encoded data slices in the DSN memory. A new set of encoded data slices includes the one or more new encoded data slices, where the data segment is recoverable from a decode threshold number of encoded data slices of the new set of encoded data slices.

Figure 18B:
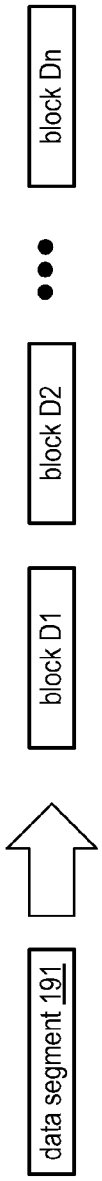
FIG. 18B is a diagram illustrating an example of encoding a data segment into a plurality of data blocks in accordance with the present invention.

FIG. 18B is a diagram illustrating an example of encoding a data segment 191 into a plurality of data blocks. The set of data blocks provides a representation of the data segment 191. For example, the data segment 191 is divided into n equal portions to form data blocks D1-Dn. As another example, the data segment 191 is divided into as many portions as required when a fixed data portion size is utilized.

Figure 18C:
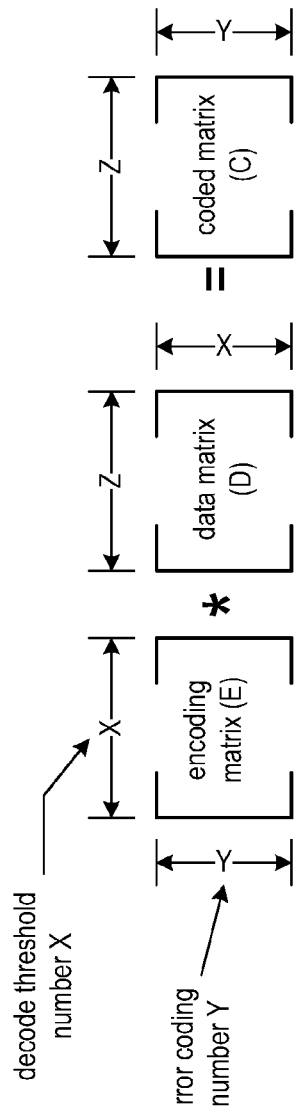
FIG. 18C is a diagram illustrating an example of matrix multiplication of an encoding matrix and a data matrix to produce a coded matrix in accordance with the present invention.

FIG. 18C is a diagram illustrating an example of matrix multiplication of an encoding matrix and a data matrix to produce a coded matrix. The encoding function may utilize a variety of encoding approaches to facilitate dispersed storage error encoding of data. The encoding function includes, but is not limited to, at least one of Reed Solomon encoding, an information dispersal algorithm, on-line codes, forward error correction, erasure codes, convolution encoding, Trellis encoding, Golay, Multidimensional parity, Hamming, Bose Ray Chauduri Hocquenghem (BCH), and/or Cauchy-Reed-Solomon.

In an example of a Reed Solomon encoding function, the matrix multiplication is utilized to encode a data segment to produce a set of encoded data blocks as a representation of the data segment. The Reed Solomon encoding function is associated with an error coding number (e.g., pillar width, number of slices per set) and a decode threshold number. As a specific example, the encoding matrix includes the error coding number of Y rows and the decode threshold number of X columns. Accordingly, the encoding matrix includes Y rows of X coefficients. The set of data blocks of the data segment is arranged into the data matrix having X rows of Z number of data words (e.g., X*Z=number of data blocks). The data matrix is matrix multiplied by the encoding matrix to produce the coded matrix, which includes Y rows of Z number of encoded values (e.g., encoded data blocks).

Figure 18D:
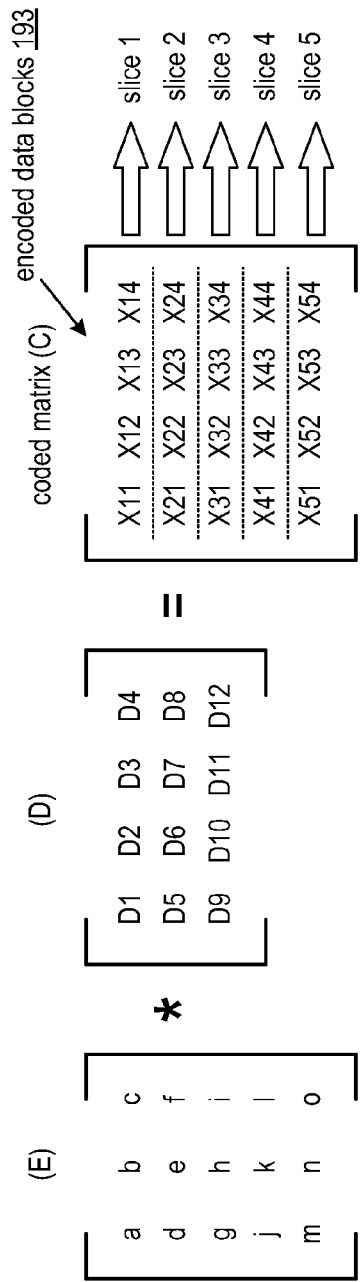
FIG. 18D is a diagram illustrating an example of matrix multiplication of an encoding matrix and a data matrix using a dispersed storage error encoding function to produce a coded matrix in accordance with the present invention.

FIG. 18D is a diagram illustrating an example of matrix multiplication of an encoding matrix and a data matrix using a dispersed storage error encoding function to produce a coded matrix. In an example of operation of using a Reed Solomon encoding function, a data segment is converted into data blocks (e.g., D1-D12) of a portion of the data matrix. Next, the encoding matrix is matrix multiplied by the data matrix to produce the coded matrix, where the coded matrix includes encoded data blocks 193. As a specific example, the dispersed storage error encoding utilizes an error coding number of five and a decode threshold number of three. The encoding matrix (E) includes five rows of three coefficients (e.g., a-o). The data segment is divided into data blocks D1-12, which are arranged into the portion of the data matrix (D) having 3 rows of 4 data blocks when the number of data blocks is 12. The number of rows of the data matrix matches the number of columns of the encoding matrix (e.g., the decode threshold number). The number of columns of the data matrix increases as the number of data blocks of the data segment increases. The data matrix is matrix multiplied by the encoding matrix to produce the coded matrix, which includes 5 rows of 4 encoded data blocks (e.g., X11-X14, X21-X24, X31-X34, X41-X44, and X51-X54). The number of rows of the coded matrix matches the number of rows of the encoding matrix (e.g., the error coding number). For instance, $X11=aD1+bD5+cD9$; $X12=aD2+bD6+cD10$; $X21=dD1+eD5+fD9$; $X31=gD1+hD5+iD9$; $X34=gD4+hD8+iD12$; and $X54=mD4+nD8+oD12$.

One or more encoded data blocks 193 from each row of the coded matrix are selected to form a corresponding encoded data slice of the set of encoded data slices. Accordingly, an error coding number of encoded data slices are produced from the coded matrix. For example, coded values X11-X14 are selected to produce an encoded data slice 1, coded values X21-X24 are selected to produce an encoded data slice 2, coded values X31-X34 are selected to produce an encoded data slice 3, coded values X41-X44 are selected to produce an encoded data slice 4, and coded values X51-X54 are selected to produce an encoded data slice 5. The data matrix (e.g., the data segment) may be recovered (e.g., to produce a recovered data segment) when any decode threshold number of corruption-free error coded data slices are available of the set of error coded data slices. Alternatively, the recovered data segment may be reproduced when a decode threshold number of encoded data blocks for each column of the coded matrix are available.

Figures 18E, 18F:
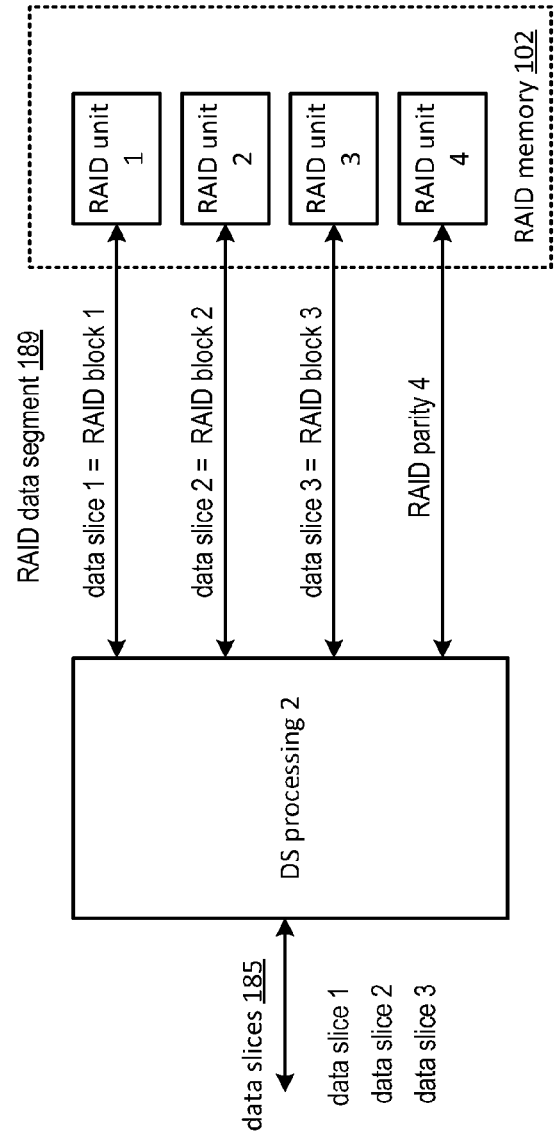
FIG. 18E is a diagram illustrating another example of matrix multiplication of an encoding matrix and a data matrix using a dispersed storage error encoding function to produce a coded matrix in accordance with the present invention.
FIG. 18F is a schematic block diagram of an embodiment of a redundant array of independent disks (RAID) storage subsystem in accordance with the present invention.

FIG. 18E is a diagram illustrating another example of matrix multiplication of an encoding matrix and a data matrix using a dispersed storage error encoding function to produce a coded matrix when a first three rows of the encoding matrix include a unity matrix (e.g., a square matrix with a decode threshold number dimension). When utilizing the unity matrix, matrix multiplying the encoding matrix by the data matrix produces the coded matrix, where the coded matrix includes encoded data blocks 193 arranged by slice where a first decode threshold number of slices is substantially the same as blocks of the data matrix (e.g., the data segment). Remaining slices of the coded matrix include error correcting slices. For instance, when utilizing a decode threshold of 3 and an error coding number of 5, a first three slices includes data slices 1-3 and a remaining 2 slices includes error correcting slices 4-5.

FIG. 18F is a schematic block diagram of an embodiment of a redundant array of independent disks (RAID) storage subsystem that includes the DS processing 2 of FIG. 18A and the RAID memory 102 of FIG. 18A. The RAID memory 102 includes the RAID units 1-4 of FIG. 18A. When storing the data slices 185 as the RAID data segment 189 in the RAID memory 102, the DS processing 2 converts the decode threshold sub-set of encoded data slices 185 into the RAID formatted data segment 189 by generating data blocks from the decode threshold sub-set of encoded data slices and generating a parity data block from the data blocks. For example, when the RAID formatted data segment 189 is to include three RAID data blocks and a RAID parity, the DS processing 2 utilizes the data slice 1 as a RAID data block 1, the data slice 2 as a RAID data block 2, the data slice 3 as a RAID data block 3, and calculates a RAID parity 4 across the array data blocks 1-3 to form a complete RAID data stripe that includes the RAID data blocks 1-3 and the RAID parity 4.

Having generated the RAID data segment 189 to include the RAID data blocks 1-4 and the RAID parity 4, the DS processing 2 stores the RAID data segment 189 in the RAID memory 102. As a specific example, the DS processing 2 stores the RAID data block 1 in the RAID unit 1, stores the RAID data block 2 in the RAID unit 2, stores the RAID data block 3 in the RAID unit 3, and stores the stores the RAID parity 4 in the RAID unit 4.

Figure 18G:
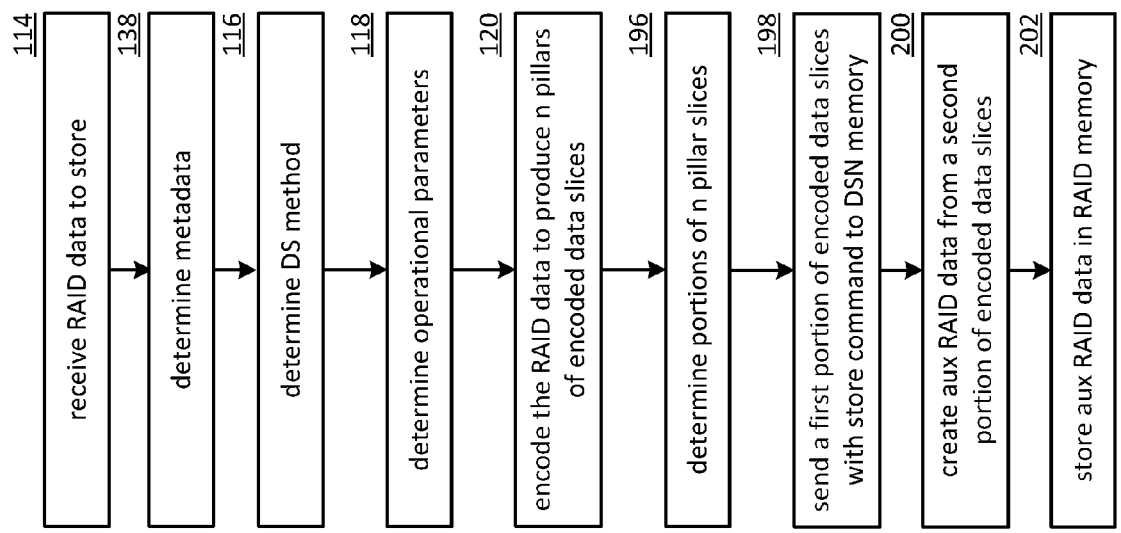
FIG. 18G is a flowchart illustrating another example of storing data in accordance with the present invention.

FIG. 18G is a flowchart illustrating another example of storing data, which includes many similar steps to FIGS. 7 and 10. The method begins with step 114 of FIG. 7 to receive redundant array of independent disks (RAID) data to store and then continues with step 138 of FIG. 10 to determine metadata of the RAID data. The method continues with step 116 of FIG. 7 to determine a dispersed storage (DS) method. For example, the processing module determines the DS method to utilize a dispersed storage network (DSN) memory only when a performance indicator indicates that reliability is favored over low access latency and the DSN memory has a high reliability capability. As another example, the processing module determines the DS method to utilize a RAID memory only when the performance indicator indicates that low access latency is favored over reliability and the RAID memory has a low access latency capability.

As yet another example, the processing module determines the DS method to utilize both the DSN memory and the RAID memory when the performance indicator indicates that both low access latency and high reliability is required and that the RAID memory has the capability of low access latency and the DSN memory has the capability of high reliability. Note that the DS method may further describe a number of pillars to be stored in which type of memory. For example, the processing module determines the DS method to encode and store a decode threshold k number of encoded data slices in the DSN memory and n-k encoded data slices in the RAID memory. Alternatively, or in addition to, the DS method further describes DS units that are included in a DS unit storage set within the DSN memory.

The method continues with steps 118-120 of FIG. 7 where a processing module encodes the RAID data to produce a set of n pillars of encoded data slices. The method continues with step 196 where the processing module determines portions of the n pillar slices based on the DS method (e.g., how many and which pillars to send to which memory type). Note that a performance improvement may be provided to the system when the first k pillars are the same as the data (e.g., when an encoding matrix that includes a unity matrix is utilized to produce the encoded data slices). The method continues at step 198 where the processing module sends a first portion of encoded data slices to the DSN memory to store the first portion of pillar slices in the DSN memory. For example, the processing module outputs at least one set of the plurality of sets of encoded data slices to the DSN memory. The method continues at step 200 where the processing module creates auxiliary RAID data from a second portion of encoded data slices in accordance with the DS method. For example, the processing module converts at least one other set of the plurality of sets of encoded data slices into a RAID format prior to outputting. The method continues at step 202 where the processing module sends the auxiliary RAID data to the RAID memory with a store command to store the second portion of encoded data slices as auxiliary RAID data in the RAID memory. For example, the processing module outputs at least one other set of the plurality of sets of encoded data slices in the RAID format to the RAID memory.

Figure 18H:
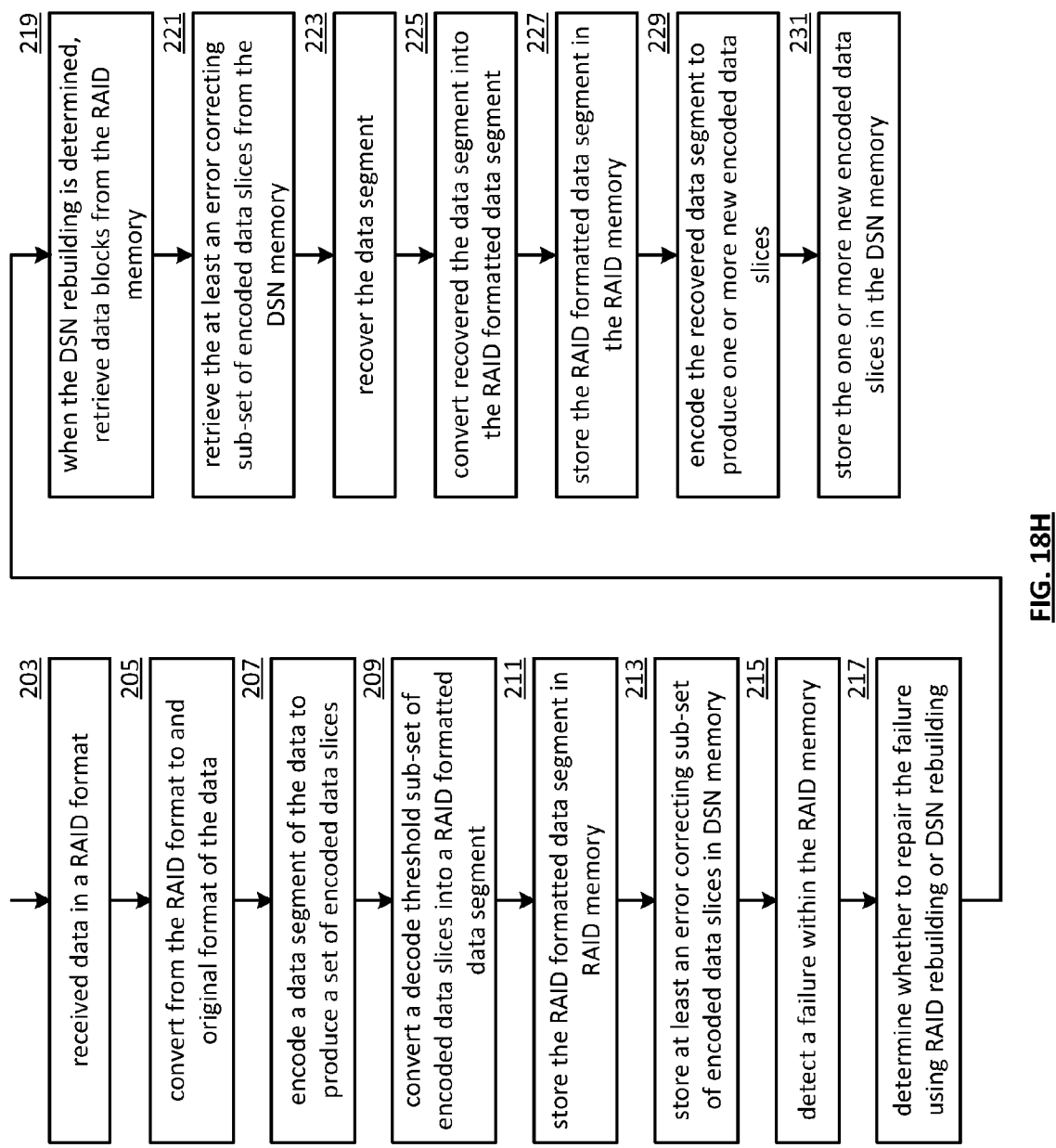
FIG. 18H is a flowchart illustrating another example of storing data in accordance with the present invention.

FIG. 18H is a flowchart illustrating another example of storing data. In particular, a method is presented for use in conjunction with one or more functions and features described in conjunction with FIGS. 1-5, 18A-G, and also FIG. 18H. The method continues at step 203 where a processing module of a computing device of a dispersed storage network (DSN) receives data in a redundant array of independent disks (RAID) format. The method continues at step 205 where the processing module converts from the RAID format to an original format of the data. For example, the processing module aggregates RAID data blocks to produce the original format of the data.

The method continues at step 207 where the processing module dispersed storage error encodes a data segment of the data in the original format to produce a set of encoded data slices, where the set of encoded data slices includes a decode threshold sub-set of encoded data slices and an error correcting sub-set of encoded data slices. The method continues at step 209 where the processing module converts the decode threshold sub-set of encoded data slices into a RAID formatted data segment. As a specific example, the processing module generates RAID data blocks from the decode threshold sub-set of encoded data slices and generating a RAID parity data block from the RAID data blocks.

The method continues at step 211 where the processing module stores the RAID formatted data segment in RAID memory. The method continues at step 213 where the processing module stores at least the error correcting sub-set of encoded data slices in DSN memory and stores the set of encoded data slices in the DSN memory. When storing the set of encoded data slices in DSN memory, for a read request of the data segment, the processing module retrieves from the RAID memory while RAID memory failures are below a first level. Alternatively, the processing module retrieves from the DSN memory when the RAID memory failures are above a second level.

The method continues at step 215 where the processing module detects a failure within the RAID memory that adversely affects storage of one or more of the RAID data blocks and the RAID parity data block. The method continues at step 217 where the processing module determines whether to repair the one or more of the RAID data blocks and the RAID parity data block using RAID rebuilding or DSN rebuilding. The determining may be based on one or more of a predetermination, a request, interpreting DSN registry information, and a number of errors of the failure. For example, the processing module selects the DSN rebuilding when the number of errors of the failure exceed a capability of correction level of the RAID rebuilding.

When the DSN rebuilding is determined, the method continues at step 219 where the processing module retrieves the RAID data blocks from the RAID memory that were not adversely affected. The method continues at step 221 where the processing module retrieves the at least the error correcting sub-set of encoded data slices from the DSN memory. The method continues at step 223 where the processing module recovers the data segment having the original format of the data from the data blocks from the RAID memory that were not adversely affected and the at least the error correcting sub-set of encoded data slices.

The method continues at step 225 where the processing module converts the recovered data segment having the original format of the data into the RAID formatted data segment. The method continues at step 227 where the processing module stores the RAID formatted data segment in the RAID memory. The method continues at step 229 where the processing module dispersed storage error encodes the recovered data segment having the original format of the data to produce one or more new encoded data slices. The method continues at step 231 where the processing module stores the one or more new encoded data slices in the DSN memory. A new set of encoded data slices includes the one or more new encoded data slices and the data segment is recoverable from a decode threshold number of encoded data slices of the new set of encoded data slices.

The method described above in conjunction with a processing module can alternatively be performed by other modules of a dispersed storage network or by other devices. In addition, at least one memory section that stores operational instructions can, when executed by one or more processing modules of one or more computing devices of a dispersed storage network (DSN), cause the one or more computing devices to perform any or all of the method steps described above.

Figure 19:
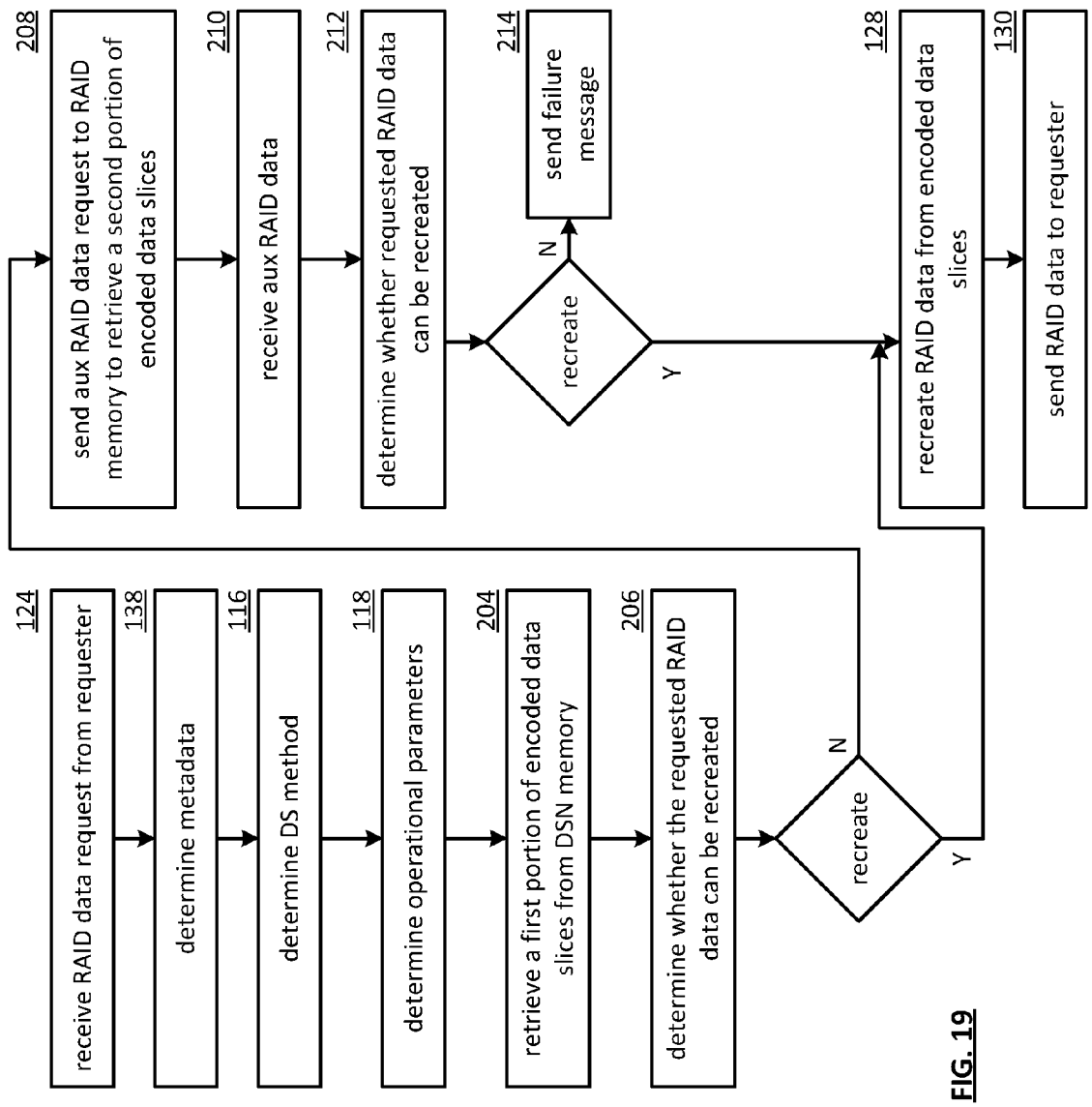
FIG. 19 is a flowchart illustrating another example of retrieving data in accordance with the present invention.

FIG. 19 is a flowchart illustrating another example of retrieving data, which includes similar steps to FIGS. 8 and 10. The method begins with step 124 of FIG. 8 to receive a RAID data request from a requester and then continues with step 138 of FIG. 10. The method continues with steps 116-118 of FIG. 7 and then continues with step 204 where a processing module retrieves a first portion of encoded data slices from a dispersed storage network (DSN) memory based in part on one or more of DSN storage location information, a storage method, and error coding dispersal storage function parameters (e.g., operational parameters). Note that the method repeats for each data segment of a plurality of data segments associated with a data object of the RAID data request. Further note that it is possible to decode each of the plurality of data segments of the data object when a read threshold number of encoded data slices are successfully retrieved for each data segment. As such, the requested RAID data can be re-created when each of the data segments of the data object is successfully re-created.

The method continues at step 206 where the processing module determines whether the requested RAID data can be re-created based on determining whether a read threshold number of encoded data slices were retrieved for all data segments. Note that there can be no missing pillars in order to successfully re-create the data object based solely on the slices retrieved from the DSN memory when the storage method indicates that exactly a read threshold number of pillars were stored in the DSN memory. The method branches to step 128 of FIG. 8 when the processing module determines that the requested RAID data can be re-created. The method continues to step 208 when the processing module determines that the requested RAID data can't be re-created so far.

The method continues at step 208 where the processing module sends an auxiliary RAID data request to a RAID memory to retrieve a second portion of encoded data slices. For example, the processing module retrieves the other n-k pillars in an attempt to successfully decode a previously un-decodable data segment. As another example, the processing module requests auxiliary RAID data corresponding to pillar slices for the data segments where there are not a read threshold number of retrieved pillars slices so far. The method continues at step 210 where the processing module receives the auxiliary RAID data from the RAID memory. Next, the processing module dispersed storage error encodes the auxiliary RAID data into a second portion of encoded data slices.

The method continues at step 212 where the processing module determines whether the requested RAID data can be re-created when a favorable comparison of a total number of required data segments compared to a number of data segments where at least a read threshold number of pillars have been received. For example, the processing module determines that the requested RAID data can be re-created when at least a decode threshold number of pillar slices have been received for each data segment of a plurality of data segments required to re-create the RAID data. The method ends at step 214 when the processing module determines that the requested RAID data can't be re-created. At step 214, the processing module sends a failure message to the requester and/or to a DS managing unit. The method continues to step 128 of FIG. 8 when the processing module determines that the requested RAID data can be re-created. The method continues with steps 128-130 of FIG. 8 to re-create RAID data from the encoded data slices and send the RAID data to the requester.

Figure 20A:
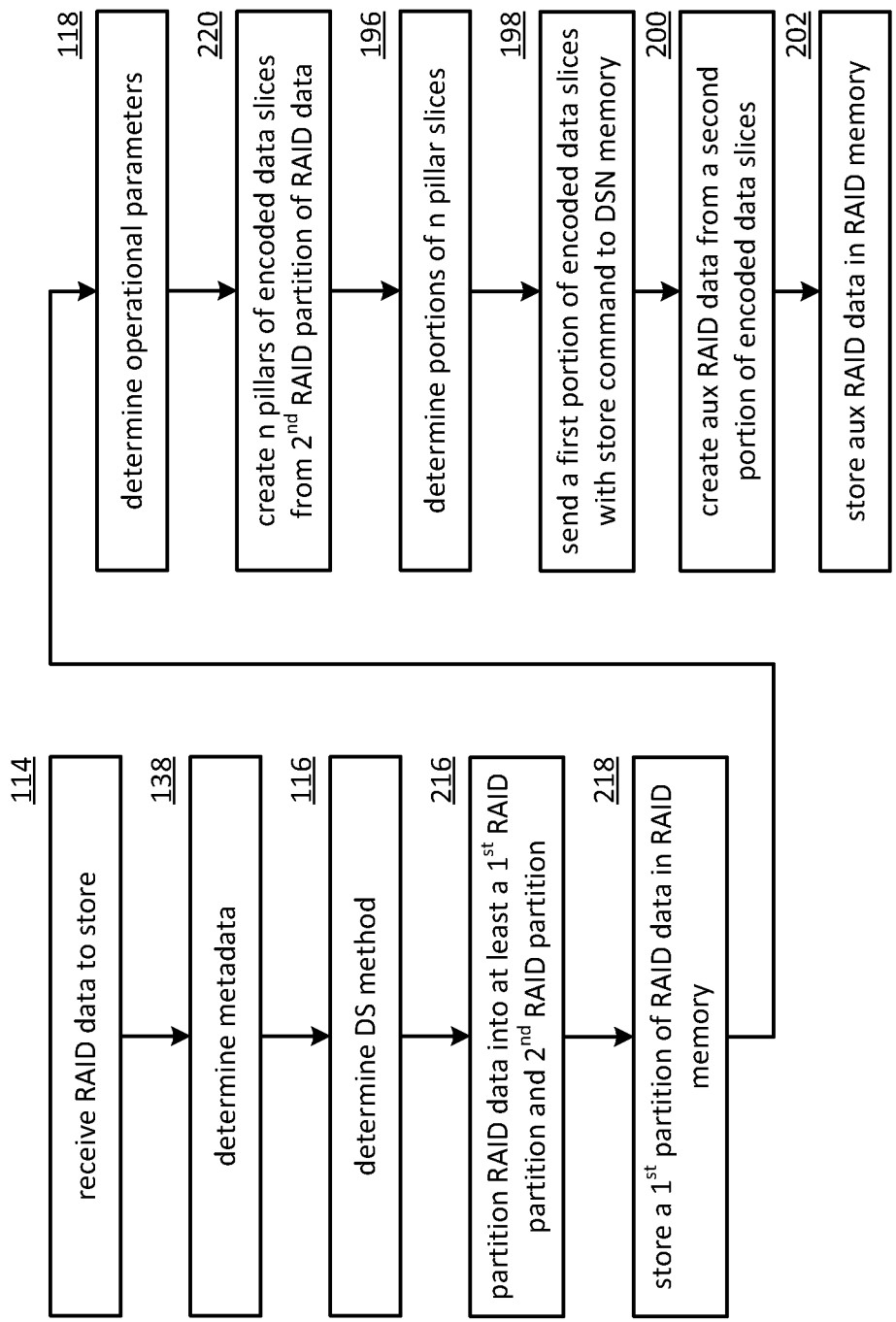
FIG. 20A is a flowchart illustrating another example of storing data in accordance with the present invention.

FIG. 20A is a flowchart illustrating another example of storing of data, which includes many similar steps to FIGS. 7, 10, and 18. The method begins with step 114 of FIG. 7 to receive RAID data to store and then with step 138 of FIG. 10. The method continues with step 116 of FIG. 7 to determine a dispersed storage (DS) method. The method continues at step 216 where a processing module partitions the RAID data into at least a first RAID partition and a second RAID partition in accordance with the DS method. For example, the processing module partitions 100% of the RAID data to the first RAID partition associated with a RAID memory when the RAID memory is much faster than a dispersed storage network (DSN) memory associated with the second RAID partition and a storage requirement indicates that fast retrieval is more important than reliability. As another example, the processing module partitions the RAID data such that the first RAID partition includes 50% of the RAID data and the second RAID partition includes 50% of the RAID data when the capacity of the RAID memory is below a RAID memory threshold. Note that this may be an interim step to migrate storage of data from the RAID memory to the DSN memory. As yet another example, the processing module partitions the RAID data such that the first RAID partition includes 0% of the RAID data and the second RAID partition includes 100% of the RAID data when the storage requirement indicates to provide higher reliability by fully utilizing the DSN memory.

The method continues at step 218 where the processing module sends RAID data of the first RAID partition with a store command to a RAID memory to store the RAID data of the first RAID partition in the RAID memory. The method continues at step 118 of FIG. 7 to determine error coding dispersal storage function parameters (e.g., operational parameters). The method continues at step 220 where the processing module dispersed storage error encodes RAID data of the second RAID partition to produce n pillars of encoded data slices in accordance with the error coding dispersal storage function parameters and the DS method. The method continues with steps 196-202 of FIG. 18.

Figure 20B:
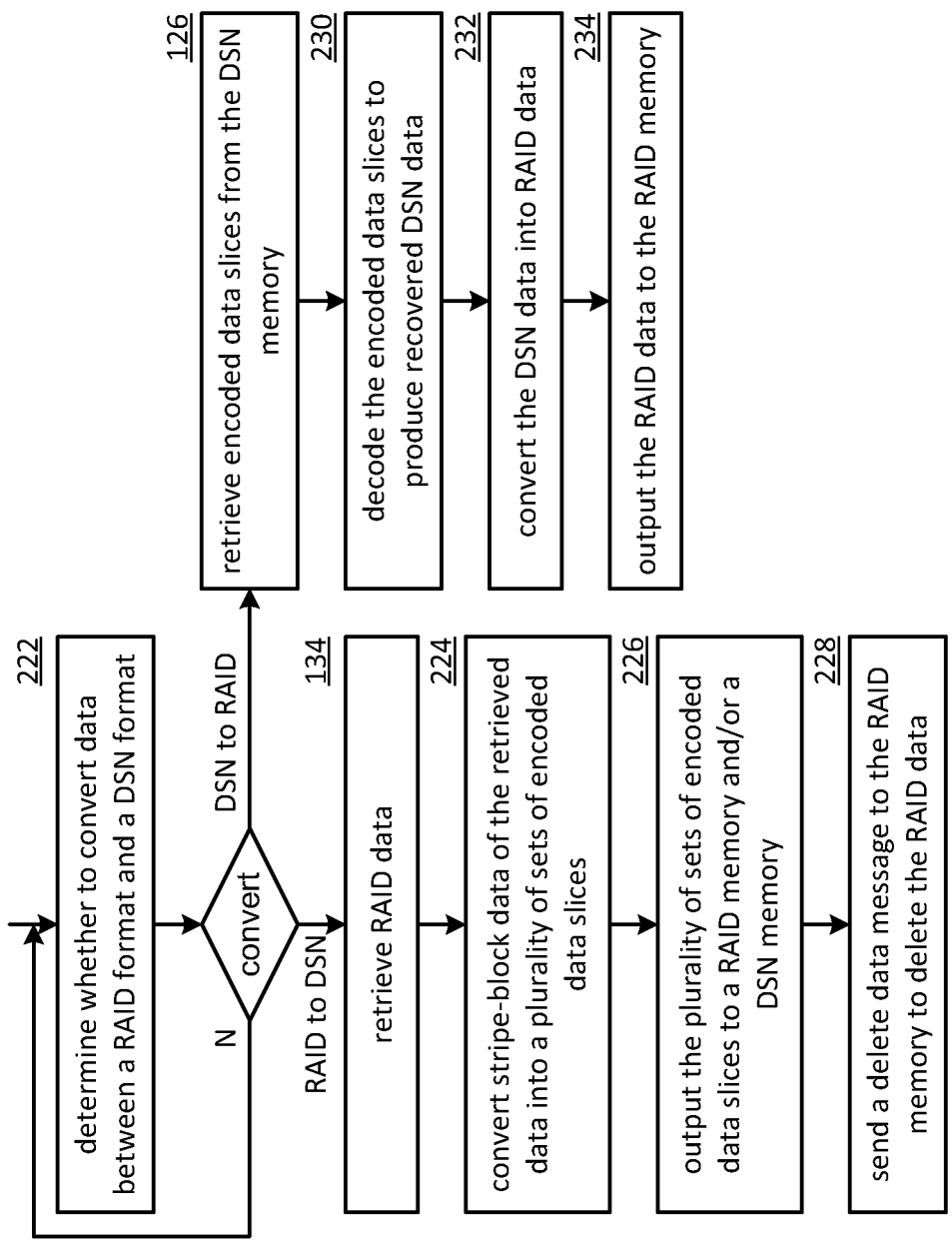
FIG. 20B is a flowchart illustrating an example of migrating data in accordance with the present invention.

FIG. 20B is a flowchart illustrating an example of migrating data, which includes steps similar to FIGS. 8 and 10. The method begins with step 222 where a processing module determines whether to convert data between a redundant array of independent disks (RAID) format and a dispersed storage network (DSN) format. Such a determination includes at least one of determining when an access frequency of the data compares favorably to an access threshold, determining when an access speed for the data compares favorably to an access speed threshold, determining when a capacity of the RAID memory compares favorably to a capacity threshold, and receiving a data conversion command. For example, the processing module determines to convert data from the RAID format to the DSN format when the capacity of the RAID memory compares favorably to a capacity threshold (e.g., the capacity of the RAID memory falls below the capacity threshold).

As another example, the processing module determines to convert data from the RAID format to the DSN format when the access frequency of the data compares favorably to the access threshold (e.g., the access frequency for the data is substantially less than the access threshold). As yet another example, the processing module determines to convert data from the DSN format to the RAID format when the access speed for the data compares favorably to the access speed threshold (e.g., access speed for the data is below the access speed threshold). The method repeats at step 222 when the processing module determines not to convert data between the RAID format and the DSN format.

The method branches to step 126 of FIG. 8 when the processing module determines to convert DSN format data to RAID format data. The method continues to step 134 of FIG. 9B when the processing module determines to convert RAID format data to DSN format data.

The method continues with step 134 of FIG. 9B where the processing module retrieves the RAID data to be converted. The method continues at step 224 where the processing module converts stripe-block data of the retrieved RAID data into a plurality of sets of encoded data slices. For example, the processing module dispersed storage error encodes the stripe-block data to produce the plurality of sets of encoded data slices, wherein the stripe-block data includes data and replicated data of the data (e.g., when the RAID format data was produced in accordance with a RAID method that includes replication such as RAID 1). As another example, the processing module dispersed storage error encodes the stripe-block data to produce the plurality of sets of encoded data slices, wherein the stripe-block data includes data and excludes replicated data of the data.

The method continues at step 226 where the processing module outputs the plurality of sets of encoded data slices to at least one of the RAID memory and the DSN memory for storage therein. For example, the processing module outputs at least one set of the plurality of sets of encoded data slices to the DSN memory and outputs at least one other set of the plurality of sets of encoded data slices to the RAID memory. As another example, the processing module outputs a sub-set of each of the plurality of sets of encoded data slices to the DSN memory and outputs remaining encoded data slices of each of the plurality of sets of encoded data slices to the RAID memory. Alternatively, or in addition to, the processing module sends an overwrite message to the RAID memory such that the RAID memory overwrites the data of the retrieved RAID data with at least some of the plurality of sets of encoded data slices. The method continues at step 228 where the processing module sends a delete data message to the RAID memory requesting the RAID memory to delete the data of the RAID data.

The method continues with 126 of FIG. 8 where the processing module retrieves the plurality of sets of encoded data slices from the DSN memory when the processing module determines to convert DSN format data to RAID format data. The method continues at step 230 where the processing module decodes the plurality of sets of encoded data slices to produce recovered DSN data. The method continues at step 232 where the processing module converts the DSN data into RAID data. The method continues at step 234 where the processing module outputs the RAID data to the RAID memory.

Figure 21:
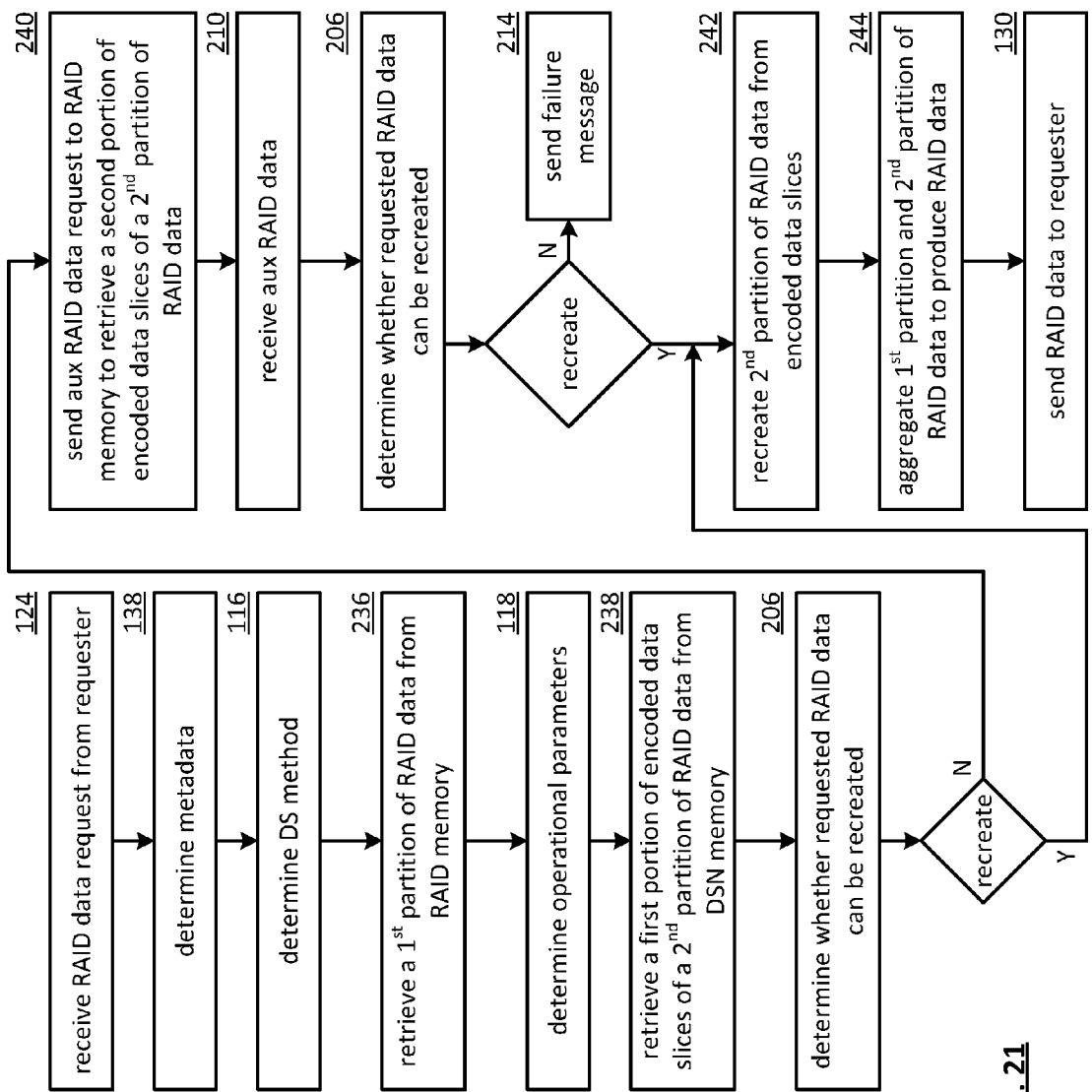
FIG. 21 is a flowchart illustrating another example of retrieving data in accordance with the present invention.

FIG. 21 is a flowchart illustrating another example of retrieving data, which includes many similar steps to FIGS. 7, 8, 10, and 19. The method begins with step 124 of FIG. 8, step 138 of FIG. 10, step 116 of FIG. 7 and then continues with step 236 where a processing module retrieves a first redundant array of independent disks (RAID) data partition from a RAID memory by sending a RAID data request to the RAID memory. The processing module receives the first RAID data partition RAID data. The method continues with step 118 of FIG. 7 to determine error coding dispersal storage function parameters.

The method continues at step 238 where the processing module retrieves a first portion of encoded data slices for a second RAID data partition of RAID data from a dispersed storage network (DSN) memory based on one or more of DSN storage location information, the storage method, and the error coding dispersal storage function parameters. Note that the method repeats for each of the data segments of the data object. Further note that it is possible to decode each of the data segments of the data object when a read threshold number of encoded data slices is successfully retrieved for each data segment. The requested RAID data can be re-created when each of the data segments of the data object is successfully re-created.

The method continues with step 206 of FIG. 19 to determine whether requested RAID data can be re-created. The method branches to step 242 when the processing module determines that the requested RAID data can be re-created. The method continues to step 240 when the processing module determines that the requested RAID data can't be re-created so far. The method continues at step 240 where the processing module sends an auxiliary RAID data request to the RAID memory to retrieve a second portion of encoded data slices of a second partition of RAID data. For example, the processing module retrieves other n-k pillars in an attempt to successfully decode a previously un-decodable data segment. Note that the processing module requests auxiliary RAID data corresponding to the pillar slices for the data segments where a decode threshold number of retrieved pillars slices have not been received so far. The method continues at step 210 of FIG. 19 to receive the auxiliary RAID data from the RAID memory. The processing module dispersed storage error encodes the auxiliary RAID data into the second portion of encoded data slices that is part of the second partition of RAID data. The method continues at step 206 of FIG. 19 to determine whether the requested RAID data can be re-created. The method ends at step 214 of FIG. 19 sending a failure message when the processing module determines that the requested RAID data can't be re-created. The method continues to step 242 when the processing module determines that the requested RAID data can be re-created.

The method continues at step 242 where the processing module recreates the second partition RAID data based on dispersed storage error decoding the retrieved encoded data slices in accordance with the error coding dispersal storage function parameters and a DS method. The method continues at step 244 where the processing module aggregates the first RAID data partition and the second RAID data partition to produce the requested RAID data. The method continues with step 136 of FIG. 8 where the processing module sends the RAID data to the requester.

Figure 22:
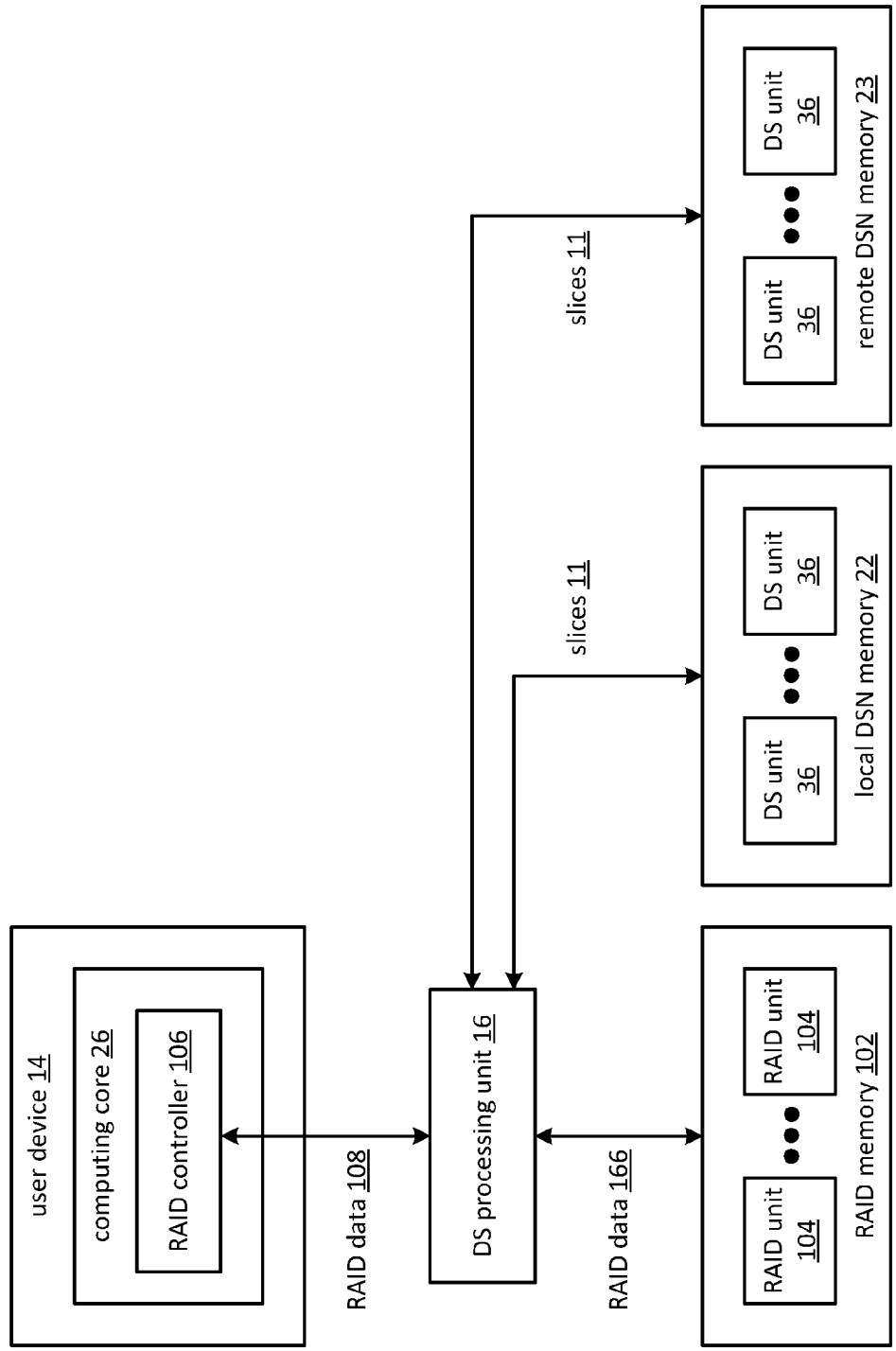
FIG. 22 is a schematic block diagram of another embodiment of a computing system in accordance with the present invention.

FIG. 22 is a schematic block diagram of another embodiment of a computing system that includes at least one user device 14, at least one redundant array of independent disks (RAID) memory 102, at least one dispersed storage (DS) processing unit 16, at least one local dispersed storage network (DSN) memory 22, and at least one remote DSN memory 23. Note that the local DSN memory 22 and the remote DSN memory 23 include a plurality of dispersed storage (DS) units 36, wherein the DS units 36 of the local DSN memory 22 are deployed at one or more sites within local proximity (e.g., at a same site) to the DS processing unit 16 and/or the user device 14, and wherein the DS units 36 of the remote DSN memory 23 are deployed at one or more sites not within local proximity (e.g., not at the same site) to the DS processing unit 16 and/or the user device 14. User device 14 includes a computing core 26, wherein the computing core 26 includes a RAID controller 106. Alternatively, or in addition to, the user device 14 may include a DS processing as discussed with reference to FIG. 6A. The RAID memory 102 includes a plurality of RAID units 104. The RAID controller 106 stores RAID data 108 in the RAID memory 102 as RAID data 166 via the DS processing unit 16 and/or RAID data 108 in the local DSN memory 22 and/or remote DSN memory 23 via the DS processing unit 16 as encoded data slices 11.

The DS processing unit 16 facilitates at least three primary functions of the system. In a first primary function, the DS processing unit 16 facilitates storing RAID data 108 as encoded data slices 11 in the local DSN memory 22 and/or remote DSN memory 23 (e.g., in response to a RAID data storage request from the RAID controller 106) and/or as RAID data 166 in the RAID memory 102. In a second primary function, the DS processing unit 16 facilitates retrieving the encoded data slices 11 from the local DSN memory 22 and/or the remote DSN memory 23 and dispersed storage error decoding encoded slices to produce recovered RAID data, and/or retrieving RAID data 166 from the RAID memory 102 to produce retrieved RAID data. Next, the processing module sends the recovered RAID data and/or the retrieved rate data as the RAID data 108 to the RAID controller 106 (e.g., in response to a RAID data retrieval request from the RAID controller 106). In a third primary function, the DS processing unit 16 facilitates migrating data between any of the RAID memory 102, the local DSN memory 22, and the remote DSN memory 23.

In an example of a data storing operation, the DS processing unit 16 receives RAID data 108 from the RAID controller 106, wherein the RAID data 108 includes a store RAID data command. The DS processing unit 16 determines which memories to utilize based on matching storage requirements to the storage capabilities of the RAID memory 102, the local DSN memory 22, and the remote DSN memory 23. The DS processing unit 16 saves the selected memory location as a memory indicator for subsequent use in a retrieval scenario. Next, the DS processing unit 16 determines a DS method when storing a portion of the RAID data 108 as encoded data slices. The DS processing unit 16 creates encoded data slices of the RAID data in accordance with the DS method when storing a portion of the RAID data 108 as encoded data slices. The DS processing unit 16 determines which of the local DSN memory 22 and the remote DSN memory 23 to utilize when storing encoded data slices in a DSN memory. The DS processing unit 16 sends the encoded data slices with a store command to the local DSN memory 22 and/or the remote DSN memory 23 for storage therein. The DS processing unit 16 stores at least a portion of the RAID data 108 as RAID data 166 in the RAID memory 102 when storing another portion of the RAID data 108 as RAID data. The method to store RAID data is discussed in greater detail with reference to FIG. 23.

In an example of data retrieval operation, the DS processing unit 16 receives RAID data 108 from the RAID controller 106, wherein the RAID data 108 includes a retrieve RAID data request. The DS processing unit 16 determines the memory locations of data associated with the retrieve RAID data request. For example, the processing module determines the encoded data slices 11 stored in the local DSN memory 22 corresponding to a portion of the requested RAID data based on where the desired data stored as indicated by the memory indicator. The DS processing unit 16 retrieves the encoded data slices from the local DSN memory 22 when the local DSN memory 22 stores at least a portion of the requested data. Next, the DS processing unit 16 determines the DS method and recovers RAID data from the retrieved encoded data slices in accordance with the DS method to produce recovered RAID data. The DS processing unit 16 retrieves a portion of the RAID data as retrieved RAID data 166 from the RAID memory 102 when the processing module determines that a portion of requested data is stored in the RAID memory 102. Next, the DS processing unit 16 aggregates the recovered RAID data from the local DSN memory 22 and the retrieved RAID data from the RAID memory 102 to produce RAID data. The DS processing unit 16 sends the RAID data as RAID data 108 to the RAID controller 106 in response to the RAID data retrieval request.

In an example of a data migration operation, the DS processing unit 16 sends RAID data 166 (e.g., including a retrieve RAID data request) to the RAID memory 102 to retrieve stored RAID data from the RAID memory 102 when the DS processing unit 16 determines to migrate RAID data from the RAID memory 102 to the local DSN memory 22 and/or the remote DSN memory 23 as encoded data slices. Next, the DS processing unit 16 receives RAID data 166 from the RAID memory 102. The DS processing unit 16 dispersed storage error encodes data of the RAID data 166 to produce encoded data slices. The DS processing unit 16 determines which of the local DSN memory 22 in the remote DSN memory 23 to utilize to store the encoded data slices. Next, the DS processing unit 16 sends the encoded data slices to the local DSN memory 22 and/or the remote DSN memory 23 for storage therein. As another example of data migration, the DS processing unit 16 retrieves encoded data slices from the remote DSN memory 23, dispersed storage error decodes the encoded data slices to produce data, transforms the data into RAID data, and sends the RAID data 166 to the RAID memory 102 for storage therein. As yet another example of data migration, the DS processing unit 16 retrieves encoded data slices from the local DSN memory 22 and sends the encoded data slices to the remote DSN memory 23 for storage therein.

Alternatively, or in addition to, the DS processing unit 16 may determine to delete one or more copies of RAID data from one or more of the RAID memory 102, the local DSN memory 22, and/or the remote DSN memory 23. Such a determination may be based on one or more of an access frequency, performance requirements, metadata, costs, and other factors to optimize the use of all of the memory types.

Figure 23:
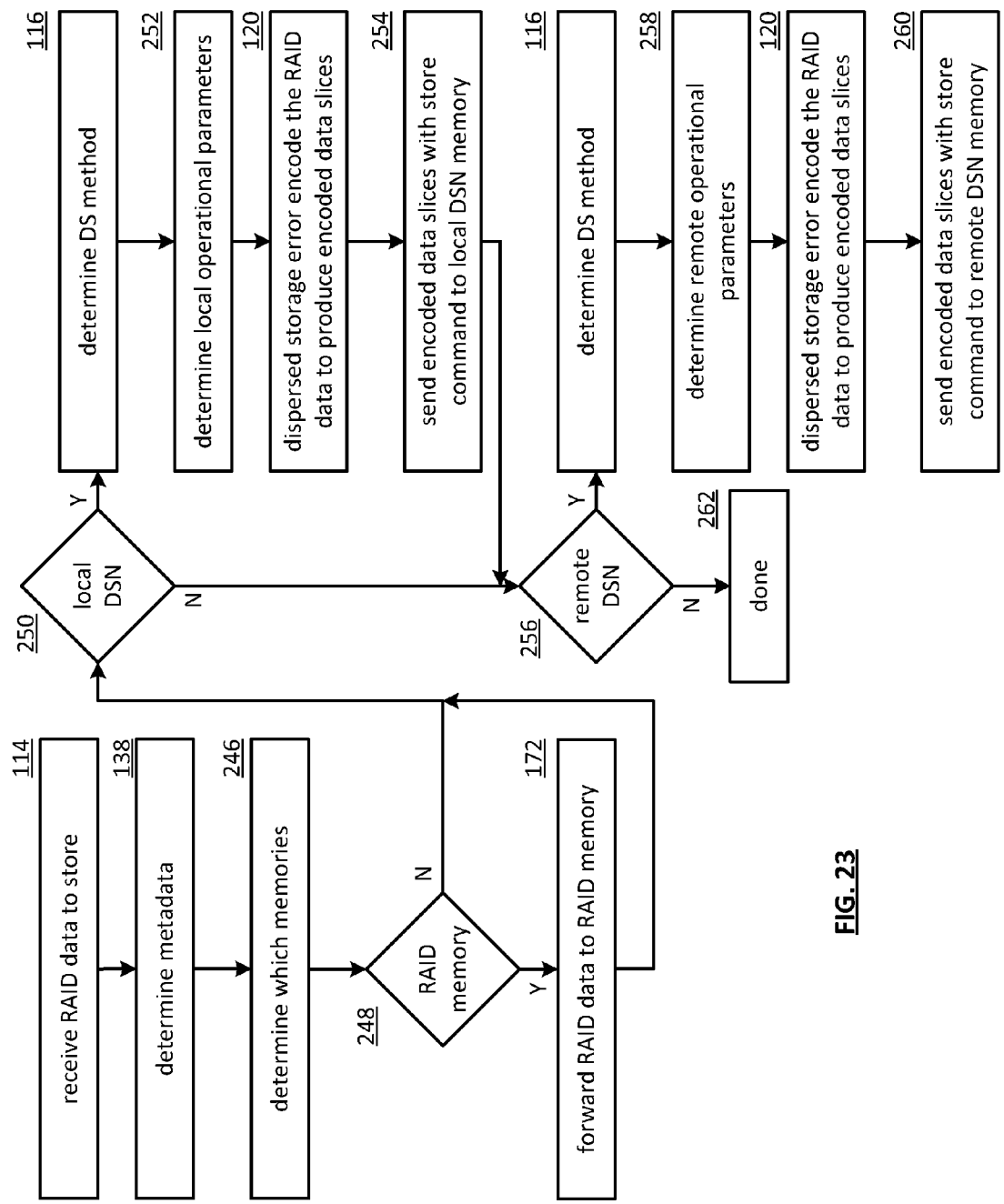
FIG. 23 is a flowchart illustrating another example of storing data in accordance with the present invention.

FIG. 23 is a flowchart illustrating another example of storing data, which includes many similar steps to FIGS. 7, 10, and 15. The method begins with step 114 of FIG. 7 where a processing module receives redundant array of independent disks (RAID) data to store and then continues with step 138 of FIG. 10 to determine metadata. The method continues at step 246 where the processing module determines which memories to utilize (e.g., a RAID memory, local and/or remote dispersed storage network (DSN) memory) based on one or more of the metadata, the RAID data, a vault lookup, a command, a message, a performance indicator, a predetermination, local DSN memory capabilities, remote DSN memory capabilities, RAID memory capabilities, and a comparison of requirements to capabilities of the RAID memory and local and/or DSN memory. The processing module saves the determination choice in a memory indicator that is stored in one or more of the RAID memory, the local DSN memory, the remote DSN memory, and a DSN user vault.

For example, the processing module determines to utilize the remote DSN memory when the performance indicator indicates that reliability is favored over low access latency and the remote DSN memory has a high reliability capability. As another example, the processing module determines to utilize the local RAID memory when the performance indicator indicates that low access latency is favored over reliability and the local RAID memory has a low access latency capability. As yet another example, the processing module determines to utilize both the local DSN memory and the RAID memory when the performance indicator indicates that both low access latency and good reliability is required and that the RAID memory has the capability of low access latency and the local DSN memory has the capability of good reliability. The method branches to the step 250 when the processing module determines to not utilize the RAID memory 248. The method continues to step 172 when the processing module determines to utilize the RAID memory 248. The method continues at step 172 of FIG. 15 where the processing module forwards the RAID data to the RAID memory.

The method continues at step 250 where the processing module determines whether to utilize the local DSN memory based on the previous memory determination. The method branches to step 256 when the processing module determines to not utilize the local DSN memory. The method continues to step 116 of FIG. 7 when the processing module determines to utilize the local DSN memory. The method continues with step 116 of FIG. 7 to determine a DS method. The method continues at step 252 where the processing module determines local error coding dispersal storage function parameters (e.g., operational parameters). Such a determination may be based on one or more of a vault lookup, RAID memory configuration information, a performance indicator, a command, a message, a predetermination, a data object name, a data object, a data object size, a data type, a data block, parity information, a user ID, RAID unit information, disk drive information, address information, memory information, a command, and a request. For example, the processing module determines the local error coding dispersal storage function parameters to include a pillar width of 4 and a decode threshold of 3 to provide fast performance and moderate reliability in accordance with a local proximity of an associated local DSN memory. The method continues with step 120 of FIG. 7 to produce encoded data slices from the RAID data. The method continues at step 254 where the processing module sends the encoded data slices to the local DSN memory for storage therein.

The method continues at step 256 where the processing module determines whether to utilize the remote DSN memory based on the previous memory determination. The method ends at step 262 when the processing module determines not to utilize the remote DSN memory. The method continues to step 116 of FIG. 7 when the processing module determines to utilize the remote DSN memory. The method continues with step 116 of FIG. 7 to determine the DS method. The method continues at step 258 where the processing module determines remote error coding dispersal storage function parameters (e.g., operational parameters). Such a determination may be based on one or more of a vault lookup, local error coding dispersal storage function parameters, RAID memory configuration information, a performance indicator, a command, a message, a predetermination, a data object name, a data object, a data object size, a data type, a data block, parity information, a user ID, RAID unit information, disk drive information, address information, memory information, a command, and a request. For example, the processing module determines the remote error coding dispersal storage function parameters to include a pillar width of 32 and a decode threshold of 20 to provide high reliability in accordance with a remote proximity of an associated remote DSN memory. The method continues with step 120 of FIG. 7 to produce encoded data slices from the RAID data. The method continues at step 260 where the processing module sends the encoded data slices to the remote DSN memory for storage therein.

Figure 24:
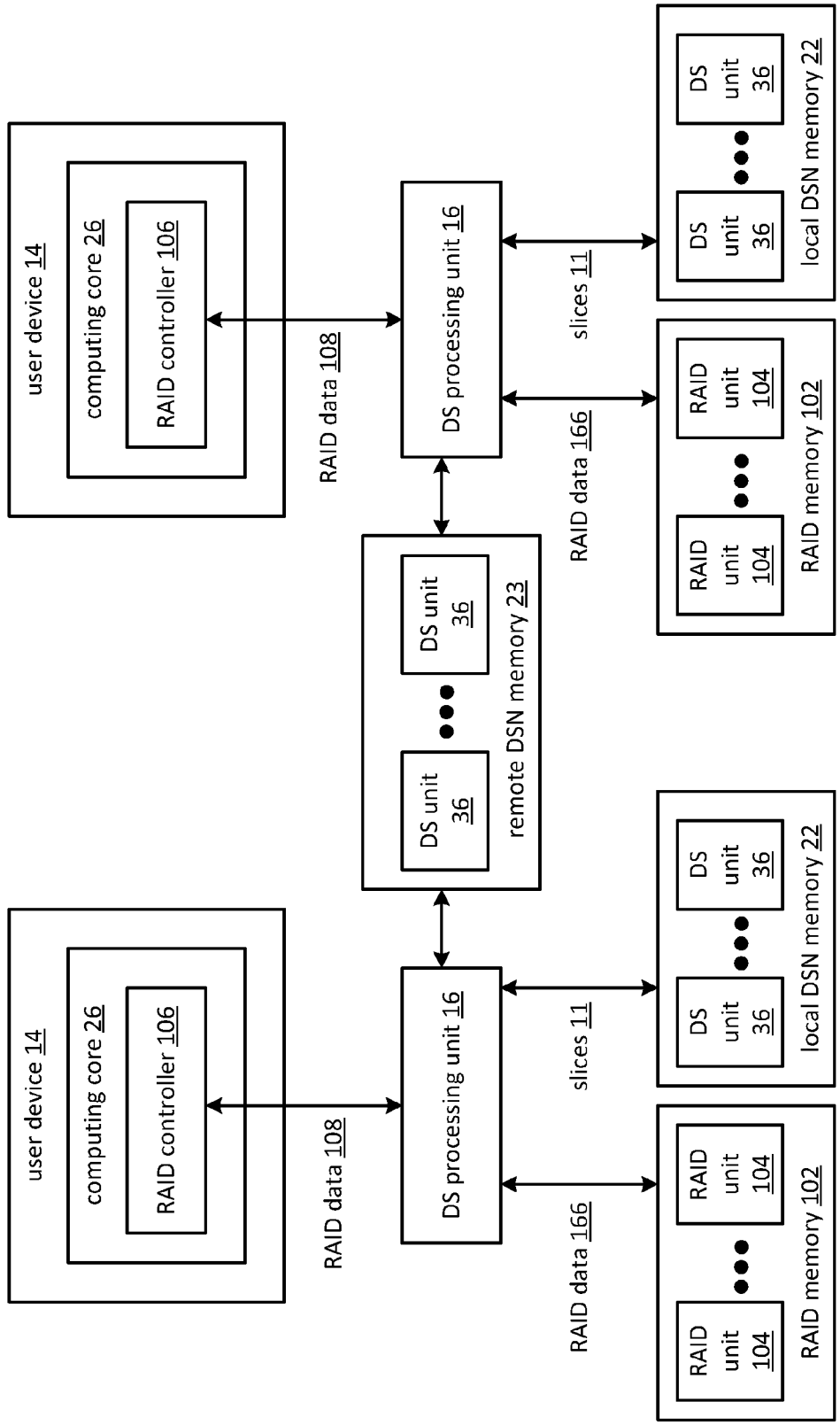
FIG. 24 is a schematic block diagram of another embodiment of a computing system in accordance with the present invention.

FIG. 24 is a schematic block diagram of another embodiment of a computing system that includes two user devices 14, two redundant array of independent disks (RAID) memories 102, two dispersed storage (DS) processing units 16, two local dispersed storage network (DSN) memories 22, and one remote DSN memory 23. Note that the system comprises two subsystems, wherein each subsystem includes the user device 14, the DS processing unit 16, the RAID memory 102, and the local DSN memory 22. Further note that each subsystem shares a common remote DSN memory 23, wherein the remote DSN memory 23 is not within local proximity of either subsystem. Each subsystem operates as previously discussed with reference to FIG. 14 with regards to storing RAID data 108 as RAID data 166 in the RAID memory 102 and as encoded data slices 11 in the local DSN memory 22. Each subsystem operates as previously discussed with reference to FIG. 22 with regards to storing RAID data 108 as encoded data slices 11 in the local DSN memory 22 or the remote DSN memory 23.

In addition, the DS processing unit 16 facilitates another function of the system. Each DS processing unit determines whether to store RAID data 108 as encoded data slices 11 in an associated local DSN memory 22 or in the common remote DSN memory 23 in accordance with a DSN memory selection method. Such a DSN memory selection method includes determining whether the RAID data 108 includes data that is common to both subsystems of the system. The DS processing unit 16 stores the RAID data 108 as encoded data slices in the remote DSN memory 23 when the data of RAID data 108 is common to both subsystems, when the data is not already stored in the remote DSN number 23, and a high level of storage reliability is required. In addition, the DS processing unit 16 stores the RAID data 108 as encoded data slices 11 in the associated local DSN memory 22 when a high-performance level of data access is required (e.g., low excess latency, frequent access sequences). The method of operation of the DS processing unit 16 is discussed in greater detail with reference to FIG. 25.

Figure 25:
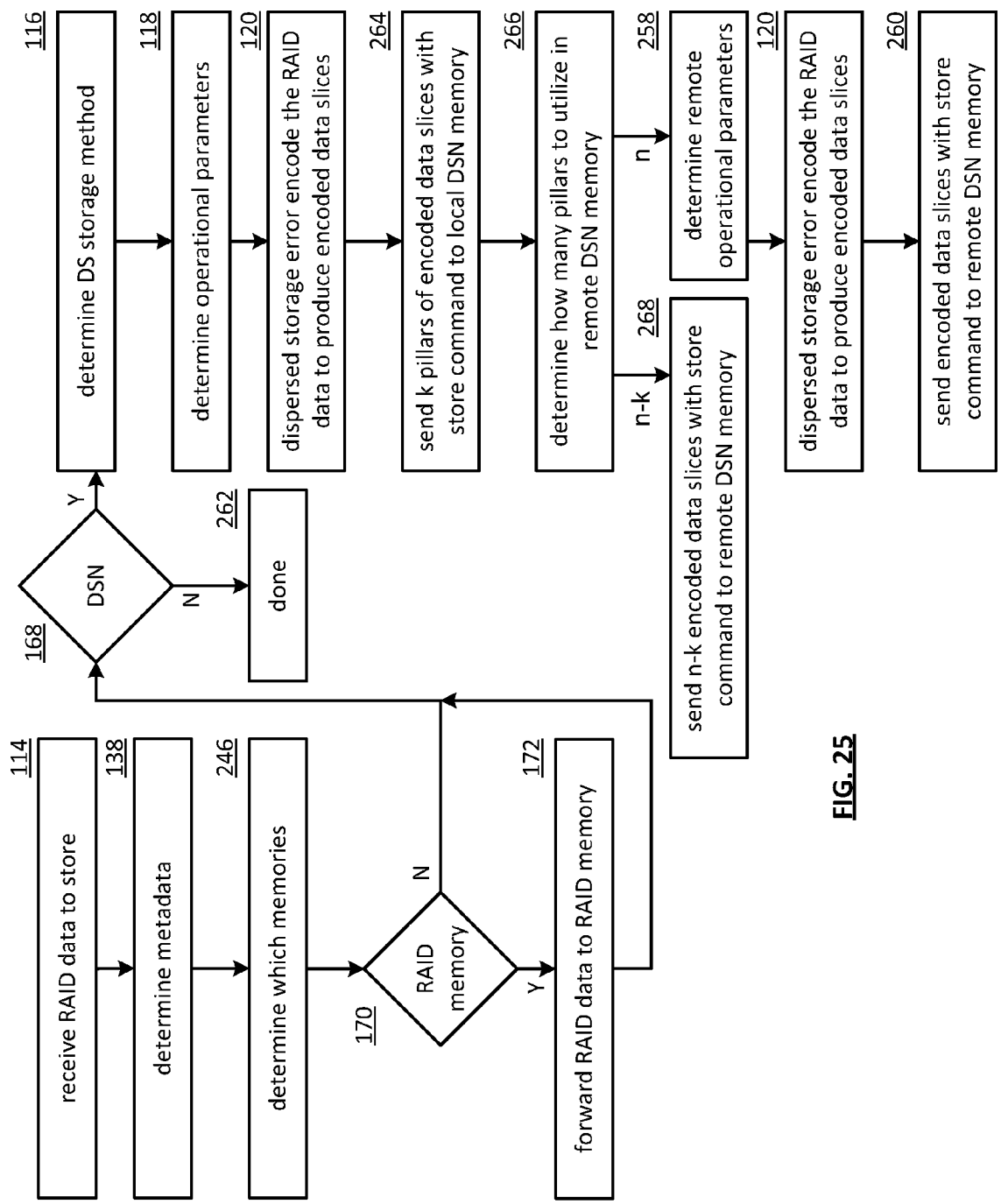
FIG. 25 is a flowchart illustrating another example of storing data in accordance with the present invention.

FIG. 25 is a flowchart illustrating another example of storing data, which includes many similar steps to FIGS. 7, 10, 15, and 23. The method begins with step 114 of FIG. 7 where a processing module receives RAID data to store and then continues with step 138 of FIG. 10 to determine metadata. The method continues with step 246 of FIG. 23 to determine which memories to utilize and then with step 170 of FIG. 15 to determine whether to utilize a RAID memory. The method branches to step 168 of FIG. 15 when the processing module determines to not utilize the RAID memory. The method continues to step 172 of FIG. 15 when the processing module determines to utilize the RAID memory. The method continues with step 172 of FIG. 15 to forward the RAID data to the RAID memory. The method continues with step 168 of FIG. 15 to determine whether to utilize a dispersed storage network (DSN) memory. The method branches to step 116 of FIG. 7 when the processing module determines to utilize the DSN memory. The method ends at step 262 when the processing module determines not to utilize the DSN memory.

The method continues with steps 116-120 of FIG. 7 where the processing module produces encoded data slices from the RAID data. The method continues at step 264 where the processing module sends a decode threshold k number of pillars of the encoded data slices with a store command to a local DSN memory for storage. Note that the decode threshold number of pillars of encoded data slices stored in the local DSN memory facilitates a subsequent retrieval with a preferred access latency.

The method continues at step 266 where the processing module determines how many pillars of encoded data slices to utilize to store in a remote DSN memory based on one or more of the metadata, the RAID data, a vault lookup, a command, a message, a predetermination, memory capabilities, and a comparison of storage requirements to memory capabilities. The processing module saves the outcome of the determination to facilitate subsequent retrieval of the data. For example, the processing module determines to store a full pillar width n number of encoded data slices in the remote DSN memory when the remote DSN memory capacity is above a capacity threshold. In another example, the processing module determines to store the pillar width minus the decode threshold number of pillar slices (n-k) in the remote DSN memory when the processing module determines that a memory utilization indicator of the remote DSN memory is above a memory utilization threshold. The method branches to step 258 of FIG. 23 when the processing module determines to store a pillar width n number of encoded data slices in the remote DSN memory. The method ends with step 268 where the processing module sends the remaining pillar width minus the decode threshold (n-k) number of encoded data slices to the remote DSN memory to store the remaining encoded data slices in the remote DSN memory.

The method continues with step 258 of FIG. 23 to determine remote error coding dispersal storage function parameters associated with the remote DSN memory. The method continues with step 120 of FIG. 7 where the processing module dispersed storage error encodes the RAID data to produce encoded data slices in accordance with the remote error coding dispersal storage function parameters. The method continues with step 260 of FIG. 23 where the processing module sends the encoded data slices to the remote DSN memory for storage therein.

Alternatively, or in addition to, the processing module determines whether the RAID data is already stored as encoded data slices in the remote DSN memory based on a retrieval of encoded data slices from the remote DSN memory that may correspond to the RAID data and/or a comparison of the retrieved encoded data slices to encoded data slices generated as described above from the RAID data. For example, the processing module sends newly created encoded data slices to the remote DSN memory for storage when the processing module determines that the RAID data is not already stored in the remote DSN memory. As another example, processing module does not send the newly created encoded data slices to the remote DSN memory for storage when the processing module determines that the RAID data is already stored in the remote DSN memory. Note that the alternative described above may provide a memory utilization efficiency improvement within the remote DSN memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by one or more processing modules of one or more computing devices of a dispersed storage network (DSN), the method comprises:
   receiving data in a redundant array of independent disks (RAID) format;
   converting from the RAID format to an original format of the data;
   dispersed storage error encoding a data segment of the data in the original format to produce a set of encoded data slices, wherein the set of encoded data slices includes a decode threshold sub-set of encoded data slices and an error correcting sub-set of encoded data slices;
   converting the decode threshold sub-set of encoded data slices into a RAID formatted data segment;
   storing the RAID formatted data segment in RAID memory; and
   storing at least the error correcting sub-set of encoded data slices in DSN memory.

2. The method of claim 1 further comprises:
   storing the set of encoded data slices in the DSN memory.

3. The method of claim 1, wherein the converting the decode threshold sub-set of encoded data slices into the RAID formatted data segment comprises:
   generating data blocks from the decode threshold sub-set of encoded data slices; and
   generating a parity data block from the data blocks.

4. The method of claim 3 further comprises:
   detecting a failure within the RAID memory that adversely affects storage of one or more of the data blocks and the parity data block;
   determining whether to repair the one or more of the data blocks and the parity data block using RAID rebuilding or DSN rebuilding;
   when the DSN rebuilding is determined:
      retrieving the data blocks from the RAID memory that were not adversely affected;
      retrieving the at least the error correcting sub-set of encoded data slices from the DSN memory; and
      recovering the data segment having the original format of the data from the data blocks from the RAID memory that were not adversely affected and the at least the error correcting sub-set of encoded data slices.

5. The method of claim 4 further comprises:
   converting the recovered data segment having the original format of the data into the RAID formatted data segment; and
   storing the RAID formatted data segment in the RAID memory.

6. The method of claim 4 further comprises:
   dispersed storage error encoding the recovered data segment having the original format of the data to produce one or more new encoded data slices; and
   storing the one or more new encoded data slices in the DSN memory, wherein a new set of encoded data slices includes the one or more new encoded data slices and wherein the data segment is recoverable from a decode threshold number of encoded data slices of the new set of encoded data slices.

7. The method of claim 1 further comprises:
   storing the set of encoded data slices in the DSN memory; and
   for a read request of the data segment:
      retrieving from the RAID memory while RAID memory failures are below a first level; and
      retrieving from the DSN memory when the RAID memory failures are above a second level.

8. A non-transitory computer readable storage medium comprises:
   at least one memory section that stores operational instructions that, when executed by one or more processing modules of one or more computing devices of a dispersed storage network (DSN), causes the one or more computing devices to:
   receive data in a redundant array of independent disks (RAID) format;
   convert from the RAID format to an original format of the data;
   dispersed storage error encode a data segment of the data in the original format to produce a set of encoded data slices, wherein the set of encoded data slices includes a decode threshold sub-set of encoded data slices and an error correcting sub-set of encoded data slices;
   convert the decode threshold sub-set of encoded data slices into a RAID formatted data segment;
   store the RAID formatted data segment in RAID memory; and
   store at least the error correcting sub-set of encoded data slices in DSN memory.

9. The non-transitory computer readable storage medium of claim 8 further comprises:
   the at least one memory section stores further operational instructions that, when executed by the one or more processing modules, causes the one or more computing devices of the DSN to:
   store the set of encoded data slices in the DSN memory.

10. The non-transitory computer readable storage medium of claim 8, wherein the one or more processing modules functions to execute the operational instructions stored by the at least one memory section to cause the one or more computing devices of the DSN to convert the decode threshold sub-set of encoded data slices into the RAID formatted data segment by:
   generating data blocks from the decode threshold sub-set of encoded data slices; and
   generating a parity data block from the data blocks.

11. The non-transitory computer readable storage medium of claim 10 further comprises:
the at least one memory section stores further operational instructions that, when executed by the one or more processing modules, causes the one or more computing devices of the DSN to:
detect a failure within the RAID memory that adversely affects storage of one or more of the data blocks and the parity data block;
determine whether to repair the one or more of the data blocks and the parity data block using RAID rebuilding or DSN rebuilding;
when the DSN rebuilding is determined:
retrieve the data blocks from the RAID memory that were not adversely affected;
retrieve the at least the error correcting sub-set of encoded data slices from the DSN memory; and
recover the data segment having the original format of the data from the data blocks from the RAID memory that were not adversely affected and the at least the error correcting sub-set of encoded data slices.

12. The non-transitory computer readable storage medium of claim 11 further comprises:
the at least one memory section stores further operational instructions that, when executed by the one or more processing modules, causes the one or more computing devices of the DSN to:
convert the recovered data segment having the original format of the data into the RAID formatted data segment; and
store the RAID formatted data segment in the RAID memory.

13. The non-transitory computer readable storage medium of claim 11 further comprises:
the at least one memory section stores further operational instructions that, when executed by the one or more processing modules, causes the one or more computing devices of the DSN to:
dispersed storage error encode the recovered data segment having the original format of the data to produce one or more new encoded data slices; and
store the one or more new encoded data slices in the DSN memory, wherein a new set of encoded data slices includes the one or more new encoded data slices and wherein the data segment is recoverable from a decode threshold number of encoded data slices of the new set of encoded data slices.

14. The non-transitory computer readable storage medium of claim 8 further comprises:
the at least one memory section stores further operational instructions that, when executed by the one or more processing modules, causes the one or more computing devices of the DSN to:
store the set of encoded data slices in the DSN memory; and
for a read request of the data segment:
retrieve from the RAID memory while RAID memory failures are below a first level; and
retrieve from the DSN memory when the RAID memory failures are above a second level.

15. A computing device of a dispersed storage network (DSN), the computing device comprises:
an interface; and
a processing module operably coupled to the interface, wherein the processing module functions to:
receive data in a redundant array of independent disks (RAID) format;
convert from the RAID format to an original format of the data;
dispersed storage error encode a data segment of the data in the original format to produce a set of encoded data slices, wherein the set of encoded data slices includes a decode threshold sub-set of encoded data slices and an error correcting sub-set of encoded data slices;
convert the decode threshold sub-set of encoded data slices into a RAID formatted data segment;
store the RAID formatted data segment in RAID memory; and
store, via the interface, at least the error correcting sub-set of encoded data slices in DSN memory.

16. The computing device of claim 15, wherein the processing module further functions to:
store, via the interface, the set of encoded data slices in the DSN memory.

17. The computing device of claim 15, wherein the processing module functions to convert the decode threshold sub-set of encoded data slices into the RAID formatted data segment by:
generating data blocks from the decode threshold sub-set of encoded data slices; and
generating a parity data block from the data blocks.

18. The computing device of claim 17, wherein the processing module further functions to:
detect a failure within the RAID memory that adversely affects storage of one or more of the data blocks and the parity data block;
determine whether to repair the one or more of the data blocks and the parity data block using RAID rebuilding or DSN rebuilding;
when the DSN rebuilding is determined:
retrieve the data blocks from the RAID memory that were not adversely affected;
retrieve the at least the error correcting sub-set of encoded data slices from the DSN memory; and
recover the data segment having the original format of the data from the data blocks from the RAID memory that were not adversely affected and the at least the error correcting sub-set of encoded data slices.

19. The computing device of claim 18, wherein the processing module further functions to:
convert the recovered data segment having the original format of the data into the RAID formatted data segment; and
store the RAID formatted data segment in the RAID memory.

20. The computing device of claim 18, wherein the processing module further functions to:
dispersed storage error encode the recovered data segment having the original format of the data to produce one or more new encoded data slices; and
store, via the interface, the one or more new encoded data slices in the DSN memory, wherein a new set of encoded data slices includes the one or more new encoded data slices and wherein the data segment is recoverable from a decode threshold number of encoded data slices of the new set of encoded data slices.

21. The computing device of claim 15, wherein the processing module further functions to:
store, via the interface, the set of encoded data slices in the DSN memory; and
for a read request of the data segment:
retrieve from the RAID memory while RAID memory failures are below a first level; and
retrieve, via the interface, from the DSN memory when the RAID memory failures are above a second level.

* * * * *